(12) United States Patent
Wennersten et al.

(10) Patent No.: US 11,122,263 B2
(45) Date of Patent: Sep. 14, 2021

(54) DERINGING FILTER FOR VIDEO CODING

(71) Applicant: TELEFONAKTIEBOLAGET LM ERICSSON (PUBL), Stockholm (SE)

(72) Inventors: Per Wennersten, Årsta (SE); Kenneth Andersson, Gävle (SE); Jack Enhorn, Kista (SE); Jacob Ström, Stockholm (SE); Ying Wang, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/468,845

(22) PCT Filed: Dec. 7, 2017

(86) PCT No.: PCT/SE2017/051222
§ 371 (c)(1),
(2) Date: Jun. 12, 2019

(87) PCT Pub. No.: WO2018/117938
PCT Pub. Date: Jun. 28, 2018

(65) Prior Publication Data
US 2020/0077090 A1    Mar. 5, 2020

Related U.S. Application Data

(60) Provisional application No. 62/438,781, filed on Dec. 23, 2016.

(30) Foreign Application Priority Data

Jul. 11, 2017    (WO) .................. PCT/SE2017/050776

(51) Int. Cl.
*H04N 19/117*    (2014.01)
*H04N 19/124*    (2014.01)
(Continued)

(52) U.S. Cl.
CPC ......... *H04N 19/117* (2014.11); *H04N 19/124* (2014.11); *H04N 19/126* (2014.11);
(Continued)

(58) Field of Classification Search
CPC ...... H04N 19/117; H04N 19/80; H04N 19/82; H04N 19/86
See application file for complete search history.

(56) References Cited

U.S. PATENT DOCUMENTS

2003/0210826 A1* 11/2003 Schwartz ............... H04N 19/40
                                                              382/247
2008/0049845 A1*  2/2008 Liu ....................... H04N 19/166
                                                              375/240.27
(Continued)

FOREIGN PATENT DOCUMENTS

WO         2016115184 A2    7/2016

OTHER PUBLICATIONS

Extended European Search Report dated Nov. 6, 2019, issued in European Patent Application No. 17883848.8, 9 pages.
(Continued)

*Primary Examiner* — David N Werner
(74) *Attorney, Agent, or Firm* — Rothwell, Figg, Ernst & Manbeck, P.C.

(57) ABSTRACT

A pixel value of a pixel in a picture of a video sequence is modified by a weighted combination of the pixel value and at least one spatially neighboring pixel value in a filtering. The filtering depends on a pixel distance between the pixel and a neighboring pixel and on a pixel value difference between the pixel and a neighboring pixel value of the neighboring pixel. The filtering is controlled by a spatial parameter and a range parameter. The spatial parameter depends on at least one of a width and a height of a transform block, and on at least one of a prediction type of a block of
(Continued)

pixels in the picture, a picture type of the picture, and a slice type of a slice in the picture.

37 Claims, 9 Drawing Sheets

(51) Int. Cl.
  *H04N 19/174* (2014.01)
  *H04N 19/176* (2014.01)
  *H04N 19/182* (2014.01)
  *H04N 19/503* (2014.01)
  *H04N 19/593* (2014.01)
  *H04N 19/82* (2014.01)
  *H04N 19/126* (2014.01)
  *H04N 19/80* (2014.01)

(52) U.S. Cl.
  CPC ......... *H04N 19/174* (2014.11); *H04N 19/176* (2014.11); *H04N 19/182* (2014.11); *H04N 19/503* (2014.11); *H04N 19/593* (2014.11); *H04N 19/80* (2014.11); *H04N 19/82* (2014.11)

(56) References Cited

U.S. PATENT DOCUMENTS

| | | | |
|---|---|---|---|
| 2010/0002147 A1 | 1/2010 | Sabo | |
| 2010/0135389 A1 | 6/2010 | Tanizawa et al. | |
| 2013/0058585 A1* | 3/2013 | Lim | H04N 19/46 382/233 |
| 2013/0077884 A1* | 3/2013 | Ikai | H04N 19/86 382/233 |
| 2013/0259120 A1* | 10/2013 | Van der Auwera | H04N 19/176 375/240.03 |
| 2013/0287097 A1 | 10/2013 | Song et al. | |
| 2015/0264406 A1 | 9/2015 | Kim et al. | |
| 2015/0365666 A1 | 12/2015 | Dong et al. | |
| 2016/0373750 A1* | 12/2016 | Xu | H04N 19/147 |
| 2017/0013260 A1 | 1/2017 | Valin et al. | |
| 2020/0128243 A1* | 4/2020 | Wang | H04N 19/17 |

OTHER PUBLICATIONS

Ström et al. "Bilateral Filter After Inverse Transform" Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0069, 3 pages.

Ström et al. "Bilateral filter strength based on prediction mode" Joint Video Exploration Team (JVET) of ITU-T SG 16 WP 3 and ISO/IEC JTC 1/SC 29/WG 11, 5th Meeting: Geneva, CH, Jan. 12-20, 2017, Document: JVET-E0032, 3 pages.

Nadernejad et al. "Enhancing perceived quality of compressed images and video with anisotropic diffusion and fuzzy filtering" Signal Processing: Image Communication, 28 (2013) pp. 222-240.

International Search Report and the Written Opinion of the International Searching Authority, issued in corresponding International Application No. PCT/SE2017/051222, dated Mar. 9, 2018, 15 pages.

Naccari et al. "Adaptive Bilateral Filter for Improved In-Loop Filtering in the Emerging High Efficiency Video Coding Standard" IEEE, 2012 Picture Coding Symposium, pp. 397-400.

Wan et al. "Perceptually Adaptive Joint Deringing—Deblocking Filtering for Scalable Video Coding" ACM, 2006, 5 pages.

Ma et al. "De-Ringing Filter for Scalable Video Coding" 2013 IEEE International Conference on Multimedia and Expo Workshops (ICMEW), 20130715, 4 pages.

Mozilla "Directional Deringing Filter, draft-valin-netvc-deringing-01" Network Working Group, Internet-Draft, 2016, 8 pages.

Zhai et al. "Image Deringing using Quadtree Based Block-shift Filtering" IEEE, 2008, pp. 708-711.

Lai, et al. "SCE4: Cross-check of SCE4.2.5 Switchable De-ringing Filter for Inter-layer Prediction (JCTVC-M0055)" Joint Collaborative Team on Video Coding (JCT-VC) of ITU-T SG 16 WP 3 and ISO/IEC JTC 1/SC 29/WG 11, MediaTek Inc., 2013, 4 pages.

Ma et al. "SCE4: Switchable De-ringing Filter for Inter-layer Prediction" Joint Collaborative Team on Video Coding (JCT-VC) of ITU-T SG 16 WP 3 and ISO/IEC JTC 1/SC 29/WG 11, Samsung Electronics, 2013, 9 pages.

* cited by examiner

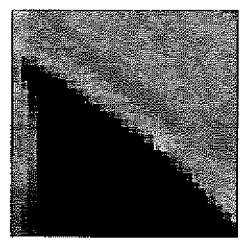
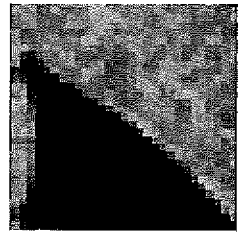
Fig. 1
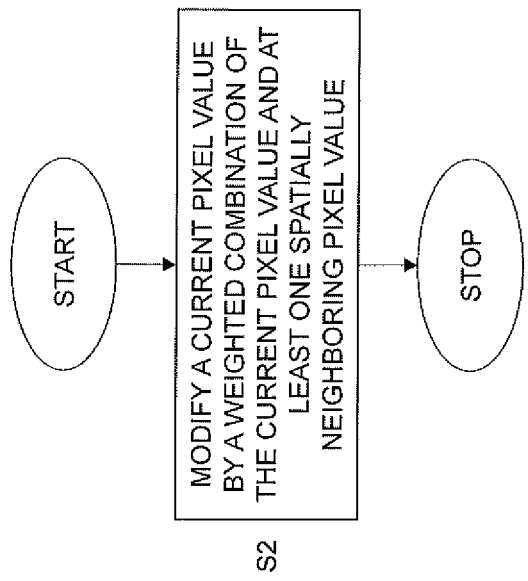
Fig. 2

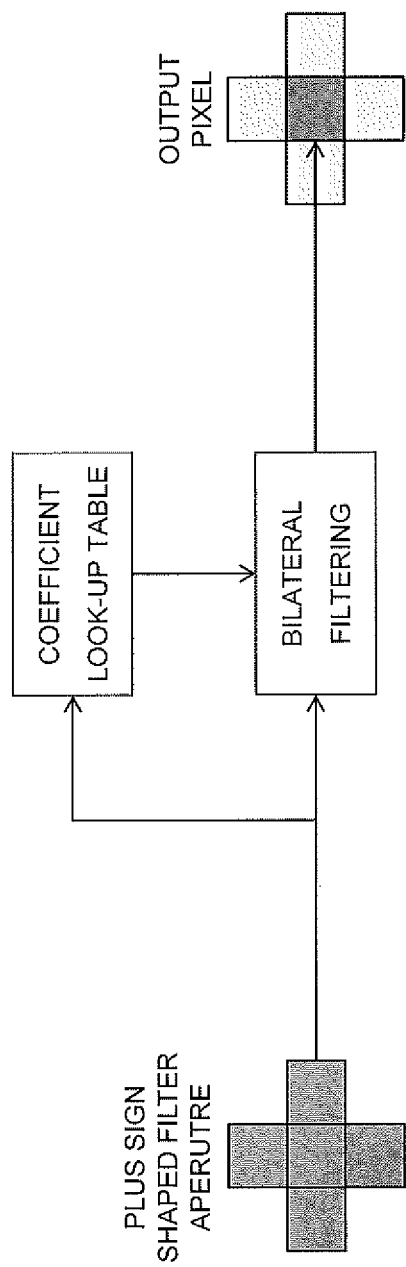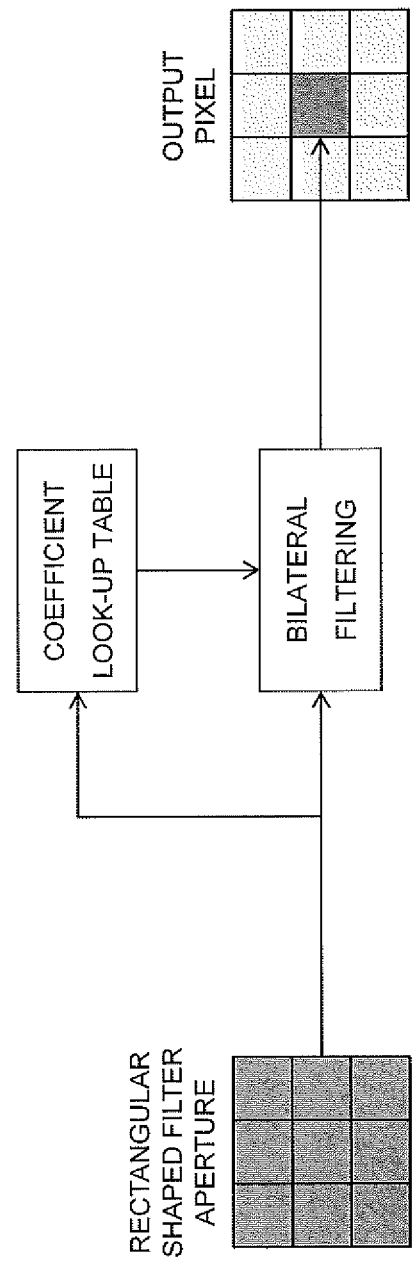

DERINGING FILTER FOR VIDEO CODING

CROSS REFERENCE TO RELATED APPLICATION(S)

This application is a 35 U.S.C. § 371 National Phase Entry Application from PCT/SE2017/051222, filed Dec. 6, 2017, designating the United States, and also claims the benefit of U.S. Provisional Application No. 62/438,781, filed Dec. 23, 2016, and U.S. International Application No. PCT/SE2017/050776, filed Jul. 11, 2017, the disclosures of which are incorporated herein by reference in their entirety.

TECHNICAL FIELD

The present embodiments generally relate to video coding, and in particular to deringing filtering in video coding.

BACKGROUND

The latest video coding standard, H.265, also known as High Efficiency Video Coding (HEVC), is a block based video codec, developed by the Joint Collaborative Team on Video Coding (JCT-VC). It utilizes both temporal and spatial prediction. Spatial prediction is achieved using intra (I) prediction from within the current picture. A picture consisting of only intra coded blocks is referred to as an I-picture. Temporal prediction is achieved using inter (P) or bi-directional inter (B) prediction on block level. HEVC was finalized in 2013.

International Telecommunication Union (ITU) Telecommunication Standardization Sector (ITU-T) Video Coding Experts Group (VCEG) and International Organization for Standardization (ISO)/International Electrotechnical Commission (IEC) Moving Picture Experts Group (MPEG) are studying the potential need for standardization of future video coding technology with a compression capability that significantly exceeds that of the current HEVC standard. Such future standardization action could either take the form of additional extension(s) of HEVC or an entirely new standard, H.266. The groups are working together on this exploration activity in a joint collaboration effort known as the Joint Video Exploration Team (JVET) to evaluate compression technology designs proposed by their experts in this area.

Ringing, also referred to as Gibbs phenomenon, appears in video frames as oscillations near sharp edges. It is a result of a cut-off of high-frequency information in the block discrete cosine transform (DCT) transformation and lossy quantization process. Ringing also comes from inter prediction where sub-pixel interpolation using filter with negative weights can cause ringing near sharp edges. Artificial patterns that resemble ringing can also appear from intra prediction, as shown in the right part of FIG. 1. The ringing effect degrades the objective and subjective quality of video frames.

As a non-iterative and straightforward filtering technique, bilateral filtering is widely used in image processing because of its edge-preserving and noise-reducing features. Unlike the conventional linear filters of which the coefficients are predetermined, a bilateral filter decides its coefficients based on the contrast of the pixels in addition to the geometric distance.

A Gaussian function has usually been used to relate coefficients to the geometric distance and contrast of the pixel values.

For a pixel located at (i, j), which will be denoised using its neighboring pixel (k, l), the weight $\omega(i,j,k,l)$ assigned for pixel (k, l) to denoise the pixel (i, j) is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

$\sigma_d$ is here the spatial parameter, and $\sigma_r$ is here the range parameter. The bilateral filter is controlled by these two parameters. I(i, j) and I(k, l) are the original intensity levels of pixels (i, j) and (k,l) respectively.

After the weights are obtained, they are normalized, and the final pixel value $I_D$ (i, j) is given by:

$$I_D(i, j) = \frac{\sum_{k,l}(k, l) * \omega(i, j, k, l)}{\sum_{k,l}\omega(i, j, k, l)} \quad (2)$$

$I_D$ is the denoised intensity of pixel (i, j).

An adaptive in-loop bilateral filter (ABLF) has been proposed for HEVC in combination with an adaptive loop filter (ALF) [1]. The filter parameter $\sigma_r$ and filter window size $\omega \times \omega$ are determined at the video encoder and then sent to the video decoder. In [1], the filter parameter $\sigma_r$ can assume one of 16 values within a range from zero up to a maximum value computed based on the horizontal and vertical image gradients over the luminance component of the frame. The filter window size $\omega$ can assume one of four predefined values, while $\sigma_d=\omega/6$.

There is no filter in HEVC and the latest version of the future video codec that completely removes ringing. Deringing deblocking filter (DBF) and a sample adaptive offset (SAO) filter have been proposed in HEVC. In addition to these, a deringing ALF filter is added into the later version of the Future Video Codec. Among those filters, SAO will remove some of the ringing artifacts but there is still room for improvements with regard to combatting ringing effects.

SUMMARY

It is a general objective to provide a deringing filtering for video coding.

This and other objectives are met by embodiments disclosed herein.

An aspect of the embodiments relates to a method for filtering a picture of a video signal. The picture comprises pixels and each pixel is associated with a pixel value. The method comprises modifying a pixel value of a pixel by a weighted combination of the pixel value and at least one spatially neighboring pixel value in a filtering that depends on a pixel distance between the pixel and a neighboring pixel and on a pixel value difference between the pixel value and a neighboring pixel value of the neighboring pixel, and is controlled by a spatial parameter and a range parameter. The spatial parameter depends on at least one of a width of a transform block and a height of the transform block, and on at least one of a prediction type of a block of pixels in the picture, the block of pixels comprises the pixel; a picture type of the picture; and a slice type of a slice in the picture, the slice comprises the pixel.

Another aspect of the embodiments relates to a device for filtering a picture of a video signal. The picture comprises pixels and each pixel is associated with a pixel value. The device is configured to modify a pixel value of a pixel by a weighted combination of the pixel value and at least one spatially neighboring pixel value in a filtering that depends on a pixel distance between the pixel and a neighboring pixel and on a pixel value difference between the pixel value and a neighboring pixel value of the neighboring pixel, and is controlled by a spatial parameter and a range parameter. The spatial parameter depends on at least one of a width of a transform block and a height of the transform block, and on at least one of a prediction type of a block of pixels in the picture, the block of pixels comprises the pixel; a picture type of the picture; and a slice type of a slice in the picture, the slice comprises the pixel.

A further aspect of the embodiments relates to a device for filtering a picture of a video signal. The picture comprises pixels and each pixel is associated with a pixel value. The device comprises a filtering unit for filtering a pixel by modifying a pixel value of the pixel by a weighted combination of the pixel value and at least one spatially neighboring pixel value in a filtering that depends on a pixel distance between the pixel and a neighboring pixel and on a pixel value difference between the pixel value and a neighboring pixel value of the neighboring pixel, and is controlled by a spatial parameter and a range parameter. The spatial parameter depends on at least one of a width of a transform block and a height of the transform block, and on at least one of a prediction type of a block of pixels in the picture, the block of pixels comprises the pixel; a picture type of the picture; and a slice type of a slice in the picture, the slice comprises the pixel.

Yet another aspect of the embodiments relates to a computer program comprising instructions, which when executed by at least one processor, cause the at least one processor to modify a pixel value of a pixel by a weighted combination of the pixel value and at least one spatially neighboring pixel value in a filtering that depends on a pixel distance between the pixel and a neighboring pixel and on a pixel value difference between the pixel value and a neighboring pixel value of the neighboring pixel, and is controlled by a spatial parameter and a range parameter. The spatial parameter depends on at least one of a width of a transform block and a height of the transform block, and on at least one of a prediction type of a block of pixels in the picture, the block of pixels comprises the pixel; a picture type of the picture; and a slice type of a slice in the picture, the slice comprises the pixel.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

An advantage of the embodiments is that the proposed deringing filtering removes or at least suppresses ringing artifacts in compressed video frames so a better video quality, both objectively and subjectively, can be achieved with a small increase in codec complexity. Objectively, coding efficiency as calculated by Bjøntegaard-Delta bit rate (BD-rate) is improved by between 0.5% and 0.7%.

BRIEF DESCRIPTION OF THE DRAWINGS

The embodiments, together with further objects and advantages thereof, may best be understood by making reference to the following description taken together with the accompanying drawings, in which:

FIG. 1 illustrates the ringing effect on a zoomed original video frame (left) and a zoomed compressed video frame (right), respectively;

FIG. 2 is a flow chart illustrating a method for filtering according to an embodiment;

FIG. 4 illustrates a plus sign shaped deringing filter aperture;

FIG. 5 illustrates a rectangular shaped deringing filter aperture of size M×N=3×3 pixels;

DETAILED DESCRIPTION

Figure 3:
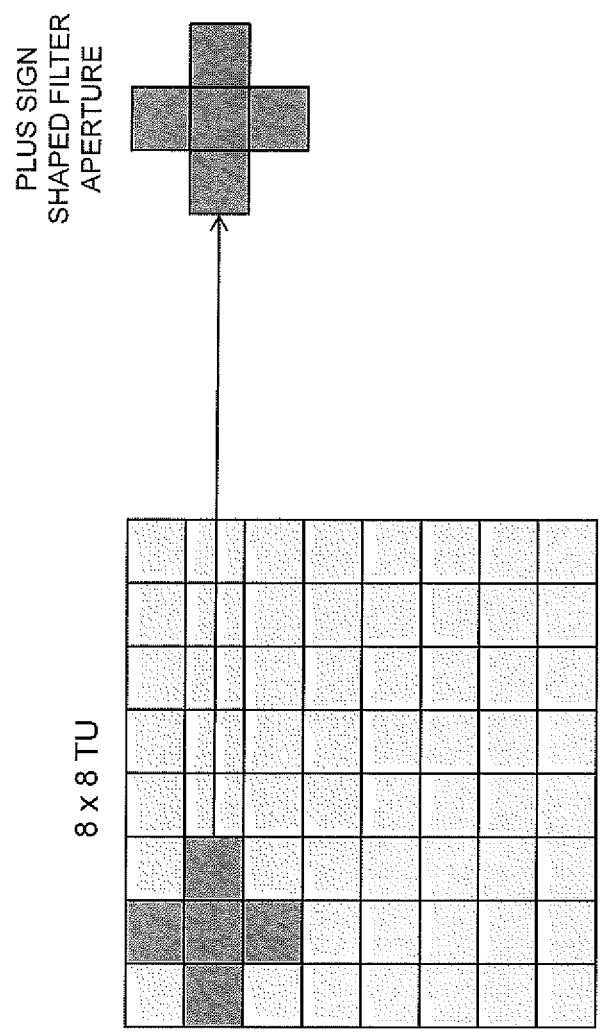
FIG. 3 illustrates an 8×8 transform unit (TU) block and a filter aperture for the pixel located at (1, 1)

Throughout the drawings, the same reference numbers are used for similar or corresponding elements.

The present embodiments generally relate to video coding, and in particular to deringing filtering in video coding. The deringing filter of the present embodiments can thereby be used in video coding, i.e., at a video encoder and/or a video decoder, preferably at both the video encoder and the video decoder, to reduce and suppress ringing artifacts. The deringing effects achieved according to the embodiments will thereby improve the quality of a video sequence following encoding, also referred to as compression, and decoding, also referred to as decompression.

FIG. 2 is a flow chart illustrating a method for filtering a picture of a video sequence according to an embodiment. The picture comprises pixels and each pixel, sometimes referred to as sample, is associated with a pixel value, sometimes referred as sample value in the art. The method comprises modifying, in step S2, a pixel value of a pixel by a weighted combination of the pixel value and at least one spatially neighboring pixel value in a filtering or filtering process. This filtering or filtering process depends on a pixel distance between the pixel and a neighboring pixel and on a pixel value difference between the pixel value and a neighboring pixel value of the neighboring pixel. The filtering or filtering process is also controlled by a spatial parameter and a range parameter. According to the embodiments, the spatial parameter depends on at least one of a width of a transform block and a height of the transform block, and on at least one of a prediction type of a block of pixels in the picture, the block of pixels comprises the pixel; a picture type of the picture; and a slice type of a slice in the picture, the slice comprises the pixel.

Thus, the pixel value of a pixel in a picture is modified in a filtering or filtering process by a weighted combination of the pixel value and the pixel value of at least one spatially neighboring pixel in the picture, denoted (spatially) neighboring pixel value herein. The filtering depends on the pixel distance(s) and pixel value difference(s) between the pixel and the least one spatially neighboring pixel and is controlled by the spatial parameter and the range parameter.

In a particular embodiment, the respective weights ω employed in the filtering are thereby dependent on the pixel distance(s) $p_d$, the pixel value difference(s) $p_r$, the spatial parameter $\sigma_d$ and the range parameter $\sigma_r$, i.e., ω=function $(p_d, p_r, \sigma_d, \sigma_r)$. In a particular embodiment, the respective weights are dependent on, i.e., a function of, the pixel distance divided by the range parameter and the pixel value difference divided by the spatial parameter, e.g., ω=function $(p_d/\sigma_d, p_r/\sigma_r)$.

According to the embodiments, the spatial parameter depends on at least one of a width of a transform block (TU width) and a height of the transform block (TU height), and on at least one of a prediction type of a block of pixels in the picture, the block of pixels comprises the pixel; a picture type of the picture; and a slice type of a slice in the picture, the slice comprises the pixel. Hence, in an embodiment, $\sigma_d = f$(TU width and/or TU height, prediction type and/or picture type and/or slice type) for some function $f( )$.

A transform block as used herein is a block of samples or pixels to which a transform is applied. There are different transforms proposed for video coding including, but not limited to, transform skip, Karhunen-Loève transform (KLT), KLT-like transforms, DCT, DCT-like transforms, discrete sine transform (DST) transforms, non-separable 2D transforms, rotational transforms and combination of these.

A block of samples or pixels to which a transform is applied is sometimes denoted transform unit (TU), TU block or simply transform block in the art. For instance, transform blocks in HEVC are square (M×M samples or pixels) and are denoted TU. In JEM, transform blocks are of a same size as a coding unit (CU) and can be rectangular (M×N) since CUs are not only originating from quadtree splits but also from binary splits in JEM. In H.264, a transform block notation is used. Generally, a transform block is a block with prediction errors on which a transform is applied.

The motivation for using transform height and/or transform width to control the spatial parameter, and thereby the weights used in the deringing filtering and the filter strength, is that smaller blocks typically contain more detail and therefore benefit from stronger filtering.

Thus, in a particular embodiment, the spatial parameter depends on the width of a transform block, i.e., the transform width, and/or the height of a transform block, i.e., the transform height.

In this embodiment $\sigma_d = g$ (TU size, prediction type and/or picture type and/or slice type) for some function $g( )$. In this case, TU size represents transform width and/or transform height, i.e., transform width, transform height or transform width and transform height.

In a particular embodiment, the spatial parameter $\sigma_d = p - A \times 0.025$. In this embodiment, A is selected from one of a minimum of the width of the transform block and the height of the transform block; a maximum of the width of the transform block and the height of the transform block; a mean of the width of the transform block and the height of the transform block; the width of the transform block; and the height of the transform block. In a particular embodiment, A is the minimum of the width of the transform block and the height of the transform block, i.e. $\sigma_d = p - \min\{TU \text{ width, } TU \text{ height}\} \times 0.025$.

In another embodiment, the spatial parameter is defined as $\sigma_d = p - \min\{TU \text{ width, } TU \text{ height, } 16\} \times 0.025$.

The parameter p is defined based on at least one of the prediction type, the picture type and the slice type.

Video coding, such as H.264, H.265 and H.266, utilizes temporal and spatial prediction. Spatial prediction is achieved using intra (I) prediction from within the current picture. Temporal prediction is achieved using inter (P) or bi-directional inter (B) prediction.

Hence, in an embodiment prediction type as used herein represents spatial prediction or temporal prediction. This embodiment corresponds to defining the prediction type to either be intra prediction or inter prediction. In another embodiment, there are two inter prediction types, i.e., inter (P) prediction and bi-directional inter (B) prediction. In this embodiment, prediction type could be intra prediction, inter (P) prediction or bi-directional inter (B) prediction.

The parameter p when defined based on the prediction type is preferably set to reduce the amount of filtering for blocks which have been predicted with higher quality compared to blocks that have been predicted with lower quality. Since blocks that have been inter predicted typically have higher quality than blocks that have been intra predicted, they are preferably filtered less to preserve the prediction quality.

Hence, in an embodiment, the parameter p is larger if the prediction type is intra prediction than if the prediction type is inter prediction.

In another embodiment, the parameter p is larger if the prediction type is intra (I) prediction than if the prediction type is inter (P) prediction. Correspondingly, the parameter p is larger if the prediction type is inter (P) prediction than if the prediction type is bi-directional inter (B) prediction.

Thus, in an embodiment, $\sigma_d = p - A \times 0.025$, wherein the parameter p can be defined based on the type of block of pixel to which the current pixel belong. For instance, different values of the parameter p can be set for intra predicted blocks and inter predicted blocks. In a particular embodiment, p=0.92 for intra predicted blocks and p=0.72 for inter predicted blocks. The motivation for this difference in the parameter p is that inter predicted blocks refer to previous frames or pictures in the video sequence where samples have already been through the deringing filter at least once, so a weaker filter is used to avoid overfiltering.

Thus, in a particular embodiment, p=0.92 if the prediction type is intra prediction and p=0.72 if the prediction type is inter prediction. In another particular embodiment, p=0.92 if the prediction type is intra (I) prediction, p=0.82 if the prediction type is inter (P) prediction and p=0.72 if the prediction type is bi-directional inter (B) prediction.

The prediction type is preferably determined for a block of pixels, sometimes denoted prediction unit (PU), PU block or prediction block in the art.

Picture or slice type as used herein preferably defines a picture to be intra picture or inter picture, and correspondingly defines a slice to be intra slice or inter slice. A picture or slice consisting of only intra coded and predicted blocks of pixels is referred to as an intra (I) picture or slice. Correspondingly, a picture or slice comprising at least one inter coded and predicted block of pixels is referred to as an inter (P or B) picture or slice.

Generally, pictures are divided into slices. A slice is typically an independently decodable part of a picture. A picture can consist of one or several slices. Intra slices can be decoded and reconstructed independently of any other slice but inter slices needs a previously decoded picture or slice to be able to predict from. Typically each slice consists of multiple blocks, sometimes denoted macro block or coding tree units. A slice is a sequence of one or more slice segments starting with an independent slice segment and containing all subsequent dependent slice segments (if any) that precede the next independent slice segment (if any) within the same picture. A slice segment is a sequence of coding tree units.

The parameter p when defined based on the picture or slice type is preferably set to reduce the amount of filtering for blocks in pictures or slices which have been predicted with higher quality compared to blocks in pictures or slices that have been predicted with lower quality. Since inter prediction typically have higher quality than intra prediction, inter picture or slices typically have less prediction error, i.e., residual, for the same quantization of the prediction error as intra picture or slices, and will thus contain less amount of coding artifacts, as ringing, from coding of the residual. Accordingly, blocks in inter predicted pictures or slices are therefore preferably filtered less to preserve the prediction quality.

Hence, in an embodiment, the parameter p is larger if the picture or slice type is intra picture or slice than if the picture or slice type is inter picture or slice.

In another embodiment, the parameter p is larger if the picture or slice type is I picture or slice than if the picture or slice type is P picture or slice. Correspondingly, the parameter p is larger if the picture or slice type is P picture or slice than if the picture or slice type is B picture or slice.

In a particular embodiment, p=0.92 if the picture or slice type is intra picture or slice and p=0.72 if the picture or slice type is inter picture or slice. In another particular embodiment, p=0.92 if the picture or slice type is I picture or slice, p=0.82 if the picture or slice type is P picture or slice and p=0.72 if the picture or slice type is B picture or slice.

Inter pictures or slices can be used for reference when predicting blocks of pixels. Thus, such inter pictures or slices can be used for reference or be so-called non-reference pictures or slices, i.e., are not used for reference. Generally, a picture or slice that is used for reference should be filtered less to preserve quality as compared to a picture or slice that is not used for reference.

In this embodiment, the parameter p is larger if the picture or slice type is intra picture or slice than if the picture or slice type is inter picture or slice that is not used for reference. Correspondingly, the parameter p is larger if the picture or slice type is inter picture or slice that is not used for reference than if the picture or slice type is inter picture or slice that is used for reference.

In a particular embodiment, p=0.92 if the picture or slice type is intra picture or slice, p=0.82 if the picture or slice type is inter picture or slice and not used for reference and p=0.72 if the picture or slice type is inter picture or slice and used for reference.

In an embodiment, the range parameter depends on a quantization parameter (QP).

In a particular embodiment, the quantization parameter that the range parameter may depend on is selected from at least one of a quantization parameter of the picture, a quantization parameter of a slice and a quantization parameter of a block of pixels. In such a case, the slice is a slice of the picture and this slice comprises the pixel, the pixel value of which is modified in step S2. Correspondingly, the block of pixels is a block of pixels in the picture and this block of pixels comprises the pixel, the pixel value of which is modified in step S2.

The motivation for using a quantization parameter to control the range parameter and thereby the weights used in the deringing filtering and the filter strength, is that for a high QP, i.e., a low bit rate, there will be a lot of ringing artifacts. This situation justifies stronger filtering. At higher bit rates there are generally less ringing artifacts to correct and the deringing filtering is weakened with lower QP values.

Thus, in a particular embodiment, the range parameter depends on a quantization parameter, such as of a quantization parameter of the picture, a quantization parameter of the slice and/or a quantization parameter of the current block of pixels, preferably the quantization parameter of the current block of pixels.

Thus, in this embodiment $\sigma_r = h(QP)$ for some function $h(\ )$.

For instance, the range parameter can be defined as $$\sigma_r = \text{clip}\left(\frac{(QP-17) \times 2^{(bit\_depth-8)}}{8}, 0.01\right).$$

In another embodiment, $$\sigma_r = \max\left(\frac{(QP-17) \times 2^{(bit\_depth-8)}}{8}, 0.01\right).$$

In these cases, bit_depth represents a bit depth of the video signal. The function max(a, b) is equal to a if a≥b and otherwise equal to b. The function clip(X, 0.01) clips the input X to 0.01, i.e., if X is larger than 0.01 then the clip function outputs 0.01, otherwise it outputs X. In a further embodiment, the range parameter is based on or equal to $$\frac{(QP-17) \times 2^{(bit\_depth-8)}}{8}.$$

In a particular embodiment, the bit depth is 10. In such a case, $\sigma_r = \text{clip}((QP-17)/2, 0.01)$, $\sigma_r = \max((QP-17)/2, 0.01)$, or $\sigma_r = (QP-17)/2$.

Thus, in an embodiment the range parameter is determined based on (QP−17)/2 or more generally on $$\frac{(QP-17) \times 2^{(bit\_depth-8)}}{8}.$$

In an embodiment, step S2 of FIG. 2 comprises modifying the pixel value of the pixel by the weighted combination of the pixel value and the at least one spatially defined pixel value using respective weights that depend on the spatial parameter and the range parameter. In a particular embodiment, the respective weights depend not only on the spatial parameter and the range parameter but also on the pixel distance(s) and the pixel value difference(s) as mentioned in the foregoing.

In a particular embodiment, step S2 comprises modifying the pixel value of the pixel by the weighted combination of the pixel value and multiple, i.e., at least two, spatially defined pixel values using respective weights that depend on the spatial parameter and the range parameter. In such an embodiment, the respective weights depend on the spatial parameter and the range parameter and also on the respective pixel distance and the respective pixel value distance for each respective pixel-neighboring pixel pair.

In an embodiment, the respective weights are $$\omega(i, j, k, l) = e^{\left(-\frac{(i-k)^2+(j-l)^2}{2\sigma_d^2}\right)} e^{\left(-\frac{\|I(i,j)-I(k,l)\|^2}{2\sigma_r^2}\right)}. \quad (1)$$

In this embodiment, I(k,l) represents a pixel value of pixel (k,l), I(i,j) represents a pixel value of pixel (i,j), $\sigma_d$ represents the spatial parameter and $\sigma_r$ represents the range parameter. It is anticipated that $\|I(i,j)-I(k,j)\|^2 = (I(i,j)-I(k,j))^2$.

In alternative embodiments, $$\omega(i, j, k, l) = e^{\left(-\frac{|i-k|+|j-l|}{2\sigma_d^2}\right)} e^{\left(-\frac{\|I(i,j)-I(k,l)\|^2}{2\sigma_r^2}\right)},$$

$$\omega(i, j, k, l) = e^{\left(-\frac{(i-k)^2+(j-l)^2}{2\sigma_d^2}\right)} e^{\left(-\frac{|I(i,j)-I(k,l)|}{2\sigma_r^2}\right)} \text{ or }$$

$$\omega(i, j, k, l) = e^{\left(-\frac{|i-k|+|j-l|}{2\sigma_d^2}\right)} e^{\left(-\frac{|I(i,j)-I(k,l)|}{2\sigma_r^2}\right)}.$$

In an embodiment, the modification of the pixel value in step S2 is performed in a bilateral filtering or bilateral filtering processing using a bilateral deringing filter. Thus in an embodiment, step S2 of FIG. 2 comprises modifying the pixel value by the weighted combination of the pixel value and the at least one spatially neighboring pixel value using a bilateral deringing filter outputting a modified pixel value $$I_D(i, j) = \frac{\sum_{k,l} I(k, l) \times \omega(i, j, k, l)}{\sum_{k,l} \omega(i, j, k, l)}. \quad (2)$$

In a particular embodiment, the bilateral deringing filter is a bilateral deringing filter with a plus sign shaped filter aperture as shown in FIGS. 3 and 4. In such a case, step S2 of FIG. 2 comprises modifying the pixel value by the weighted combination of the pixel value and the at least one spatially neighboring pixel value using a bilateral deringing filter with a plus sign shaped filter aperture outputting the modified pixel value $$I_D(i, j) = \frac{\sum_{k,l} I(k, l) \times \omega(i, j, k, l)}{\sum_{k,l} \omega(i, j, k, l)}.$$

In this embodiment, k=i−1,i,i+1 and l=j−1,j,j+1 with the proviso that when k=i−1,i+1 then l=j and when l=j−1,j+1 then k=i.

In another embodiment, the bilateral deringing filter has a square (M×M) or rectangular (M×N) shaped filter aperture as shown in FIG. 5. For instance, for the case of a 3×3 bilateral deringing filter k=i−1,i,i+1 and l=j−1,j,j+1.

In an embodiment, the weights of the deringing filter are calculated both at the video encoder and at the video decoder. In such a case, the method comprises an optional step of calculating the weights based on the spatial parameter and the range parameter but also on the pixel distance(s) and the pixel value difference(s) as mentioned in the foregoing.

In another embodiment, the weights of the deringing filter are calculated at the video encoder. The weights, or encoded representations thereof, are then included or signaled in the encoded bitstream and thereby signaled from the video encoder to the video decoder. The video decoder can thereby retrieve the weights calculated by the video encoder from the encoded bitstream representing an encoded representation of the pictures of the video sequence, or the video decoder can obtain the weights from the encoded presentations of the weights signaled in the encoded bitstream.

Calculation of the weights may, however, by be computational expensive and could thereby become a bottleneck, in particular during video decoding. An alternative approach is to have one or more look-up tables (LUTs) comprising pre-computed weights. In an embodiment, a correct weight can then be retrieved from the LUT using a LUT index as schematically illustrated in FIGS. 4 and 5.

In a first embodiment, the LUT index is the range parameter, the spatial parameter, the pixel distance Δijkl and the pixel value difference ΔI, i.e., LUT ($\sigma_r$, $\sigma_d$, Δijkl, ΔI). In the case of a bilateral deringing filter with a plus shaped filter aperture, the pixel distance will be 1 for spatially neighboring pixels and 0 for the current pixel. Furthermore, the pixel value difference will be 0 for the current pixel. Accordingly, the weight for the current pixel will be equal to 1. Hence, for such a bilateral deringing filter there is no need to use the pixel distance as LUT index. This means that the LUT index instead is the range parameter, the spatial parameter, and the pixel value difference, i.e., LUT ($\sigma_r$, $\sigma_d$, ΔI).

It is, however, possible to only use the range parameter and the pixel value difference as LUT indices for a bilateral deringing filter with plus shaped filter aperture as further shown in the following implementation embodiments. Hence, in an embodiment, LUT ($\sigma_r$, ΔI).

Instead of calculating the range and spatial parameters and using them as LUT index, the transform width and/or transform height and at least one of prediction type, picture type and slice type, and optionally quantization parameter, could be used together with the pixel value difference or together with the pixel value difference and the pixel distance as LUT, i.e., LUT(TU width and/or TU height, prediction type and/or picture type and/or slice type, Δijkl, ΔI), LUT(TU width and/or TU height, prediction type and/or picture type and/or slice type, ΔI), LUT(min{TU width, TU height}, prediction type and/or picture type and/or slice type, Δijkl, ΔI), LUT(min{TU width, TU height}, prediction type and/or picture type and/or slice type, ΔI), LUT(TU width and/or TU height, prediction type and/or picture type and/or slice type, QP, Δijkl, ΔI), LUT(TU width and/or TU height, prediction type and/or picture type and/or slice type, QP, ΔI), LUT(min{TU width, TU height}, prediction type and/or picture type and/or slice type, QP, Δijkl, ΔI), or LUT(min{TU width, TU height}, prediction type and/or picture type and/or slice type, QP, ΔI).

The pre-computed weights could be present in a single LUT or in multiple LUTs. For instance, pre-computed values of $$e^{\left(-\frac{(i-k)^2+(j-l)^2}{2\sigma_d^2}\right)}$$

could be present in one LUT whereas pre-computed values of $$e^{\left(-\frac{\|I(i,j)-I(k,j)\|^2}{2\sigma_r^2}\right)}$$

could be present in a second LUT.

Figure 6:
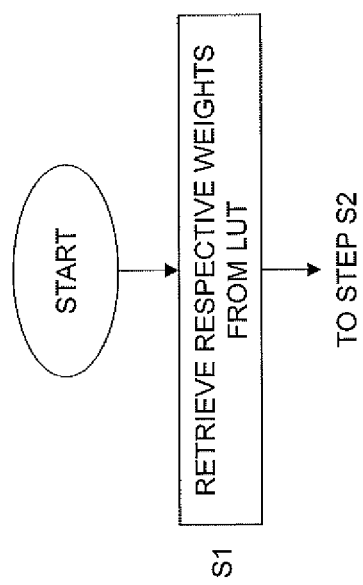
FIG. 6 is a flow chart illustrating an additional, optional step of the method shown in FIG. 2.

FIG. 6 is a flow chart illustrating an additional, optional step of the method shown in FIG. 2. In this embodiment, the respective weights are retrieved from a LUT in step S1. The method then continues to step S2 in FIG. 2.

In a particular embodiment, step S1 comprises retrieving the respective weights from a LUT comprising pre-computed weights using i) the range parameter $\sigma_d$ or the quantization parameter and ii) a difference in pixel values $\Delta I$ as LUT index.

A LUT with pre-computed weights could be used both at the video encoder and at the video decoder. In an alternative embodiment, the LUT is used at the video encoder, or the LUT is used at the video decoder.

In an embodiment, the deringing filter is applied to each transform block, such as TU, after inverse transform in a video encoder and in a video decoder.

In another embodiment, the deringing filter is applied to reconstructed samples, i.e., pixel values, at the video encoder and the video decoder. For instance, the deringing filter can be applied to both intra and inter predicted blocks after the reconstructed residual samples have been added to the intra or inter predicted samples to reconstruct the samples, i.e., pixel values, in the block of pixels.

Intra predicted blocks typically use prediction from previously reconstructed blocks but typically before in-loop filtering. In such a case, the deringing filtering is preferably performed before the block is used for intra prediction so that intra prediction can benefit from the filtering.

The deringing filter of the embodiments can also be used during rate-distortion optimization (RDO) in the video encoder. RDO is part of the video encoding process. It improves coding efficiency by finding the "best" coding parameters. It measures both the number of bits used for each possible decision outcome of the block and the resulting distortion of the block.

Thus, the deringing filter of the embodiments is preferably used in RDO so that the video encoder will base its decision on the result of the deringing filtering, for instance when selecting block size, coding parameters, etc.

In video coding, the original colors, typically in a red, green, blue (RGB) color space, of the pixels are transformed into luma (Y') and chroma (Cb, Cr) values in the Y'CbCr color space prior to encoding. Corresponding, following decoding, the reconstructed pixel values are transformed into RGB values. The deringing filter of the embodiments can be applied to luma values, to chroma values or to both luma and chroma values. Other color spaces used in video coding comprise luminance (Y) values. Hence, the deringing filter of the embodiments can also be applied to luminance values. A further example is the $IC_TC_P$ color space with intensity luma (I) value and blue-yellow ($C_T$) and red-green ($C_P$) values. The deringing filter of the embodiments can then be applied to I values and/or Cr and $C_P$ values.

An aspect of the embodiments defines a method, performed by a filter, for filtering a picture of a video signal. The picture comprises pixels, each pixel being associated with a pixel value. The method comprises modifying a pixel value by a weighted combination of the pixel value and at least one spatially neighboring pixel value. The filtering is controlled by two parameters $\sigma_d$ and $\sigma_r$. In an embodiment, $\sigma_d$ depends on a pixel distance between the pixel value and the neighboring pixel value. In an embodiment, a, depends on a pixel value difference between the pixel value and the neighboring pixel value. At least one of the parameters $\sigma_d$ and $\sigma_r$ also depends on at least one of: quantization parameter, quantization scaling matrix, transform width, transform height, picture width, picture height, a magnitude of a negative filter coefficient used as part of inter/intra prediction.

Herein various embodiments will be described in further detail.

Embodiment 1

According to a first embodiment of the present invention, a bilateral deringing filter with a plus sign shaped filter aperture is used directly after inverse transform. An identical filter and identical filtering process is used in the corresponding video encoder and decoder to ensure that there is no drift between the encoder and the decoder.

The first embodiment of the current invention describes a way to remove ringing artifacts by using a deringing filter designed in this invention. The deringing filter is evolved from a bilateral filter in this embodiment.

By applying the deringing filter, each pixel in the reconstructed picture is replaced by a weighted average of itself and its neighbors. For instance, a pixel located at (i, j), will be denoised using its neighboring pixel (k, l). The weight $\omega(i,j,k,l)$ is the weight assigned for pixel (k, l) to denoise the pixel (i, j), and it is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

I(i, j) and I(k, l) are the original reconstructed intensity value of pixels (i, j) and (k, l), respectively. $\sigma_d$ is the spatial parameter, and $\sigma_r$ is the range parameter. The bilateral filter is controlled by these two parameters. In this way, the weight of a reference pixel (k, l) to the pixel (i, j) is dependent both on the distance between the pixels and the intensity difference between the pixels. In this way, the pixels located closer to the pixel to be filtered, and that have smaller intensity difference to the pixel to be filtered, will have larger weight than the other more distant, with regard to spatial position and intensity pixels. In an embodiment, $\sigma_d$ and $\sigma_r$ are constant values, i.e., do not depend on any other coding parameter. In another embodiment, $\sigma_d$ and $\sigma_r$ are determined according to any of the Embodiments 4 to 7, 9, 11, 18 to 20.

The deringing filter is, in an embodiment, applied to each transform unit (TU) block after inverse or reverse transform in an encoder, as shown in FIG. 3. This means, for example, that subsequent intra-coded blocks will predict from the filtered pixel values. The filter may also be used during RD optimization in the encoder. The identical deringing filter is also applied to each TU block after reverse transform in the corresponding video decoder.

In general, the deringing filter can be applied to both intra and inter predicted samples, i.e., pixel values, reconstructed residual samples or on samples after the reconstructed residual samples have been added to the intra or inter predicted samples to reconstruct the samples in the block of pixels.

Intra predicted blocks typically use prediction from previously reconstructed blocks but typically before in-loop filtering. In such a case, the deringing filtering is preferably performed before the block is used for intra prediction so that intra prediction can benefit from the filtering.

In this embodiment, each pixel in the transform unit is denoised using its direct neighboring pixels only, as shown in FIG. 4. The filter has a plus sign shaped filter aperture centered at the pixel to be filtered. The output filtered pixel intensity $I_D(i, j)$ is:

$$I_D(i, j) = \frac{\sum_{k,l} I(k, l) * \omega(i, j, k, l)}{\sum_{k,l} \omega(i, j, k, l)} \quad (2)$$

For a plus sign shaped filter aperture k=i−1, i, i+1 and l=j−1, j, j+1 with the proviso that when k=i−1 or i+1 then l=j and when l=j−1 or j+1 then k=i.

In an efficient implementation of the first embodiment, in a video encoder or decoder, all possible weights (coefficients) of the proposed deringing filter are calculated and stored in a two-dimensional look-up-table (LUT). The LUT can, for instance, use spatial distance and intensity difference between the pixel to be filtered and reference pixels as index of the LUT. In the case where the filter aperture is a plus, there will only be two distances; the distance 0 for the middle pixel and the distance 1 for the other four pixels. Furthermore, the middle pixel will not have any intensity difference since the middle pixel is the filtered pixel and therefore its weight will always be $e^0=1$ when calculated using equation 1. Thus in the case of the plus shaped filter of FIG. 4, it will be sufficient with a one-dimensional lookup table (LUT), indexed on the difference in intensity, or indexed on the absolute value of the difference in intensity.

Instead of one LUT one could have one LUT dedicated to a weight dependent on distance from the current pixel ($\omega_d$) and another LUT dedicated to a weight dependent on closeness in pixel value ($\omega_r$). It should be noted that the exponential function used to determine the weights could be some other function as well. The LUT could be optimized based on some error metric, such as sum of squared difference (SSD), structural similarity (SSIM) or according to human vision.

Instead of one LUT one could also have one LUT for weights vertically above or below of current pixel and another LUT for weights horizontally left or right of current pixel.

Embodiment 2

According to the second embodiment of the present invention, a deringing filter with a rectangular shaped filter aperture is used, such as in the RD optimization process of a video encoder. The same filter is also used in the corresponding video decoder.

The deringing filter is preferably applied to reconstructed values obtained by adding predictions to the residuals obtained following inverse quantization and inverse transformation. In another embodiment, the deringing filter is applied to residual values from the inverse transform.

In the second embodiment of the present invention each pixel is denoised using its neighboring pixels within a M by N size rectangular shaped filter aperture centered at the pixel to be denoised, as shown in FIG. 5. In a particular embodiment, M=N, hence the deringing filter has a quadratic shaped filter aperture. For a 3×3 shaped filter aperture k=i−1, i, i+1 and l=j−1, j, j+1.

The same deringing filter as in the first embodiment is used.

Embodiment 3

The deringing filter according to the third embodiment of the present invention is used after prediction and transform have been performed for an entire frame or part of a frame. The same filter is also used in the corresponding video decoder.

The third embodiment of the current invention is the same as the first or second embodiment, except that the filtering is not done right after the inverse transform. Instead the proposed filter applies to reconstructed picture in both encoder and decoder. On one hand this could lead to worse performance since filtered pixels will not be used for intra prediction, but on the other hand the difference is likely very small and the existing filters are currently placed at this stage of the encoder and decoder.

Embodiment 4

In this embodiment, $\sigma_d$ and/or $\sigma_r$ are related to TU size.
The parameters $\sigma_d$ and $\sigma_r$ can be a function of the form, e.g., a polynomial function:

$$\sigma_d = f_1(TU\ size)$$

$$\sigma_r = f_2(TU\ size)$$

If both $\sigma_d$ and $\sigma_r$ are derived based on TU size, a preferred embodiment is to have different functions $f_1 \neq f_2$. If the transform unit is non-quadratic, it may be possible to instead use $\sigma_d = 0.92 - \min\{TU\ block\ width,\ TU\ block\ height\}*0.025$. Alternatively, it is possible to use $\sigma_d = 0.92 - \max\{TU\ block\ width,\ TU\ block\ height\}*0.025$, or $\sigma_d = 0.92 - \text{mean}\{TU\ block\ width,\ TU\ block\ height\}*0.025$, where mean$\{a, b\} = (a+b)/2$.

When transform size is different in vertical and horizontal directions, the $\sigma_d$ can be separate for filter coefficients vertically and horizontally so $\sigma_{d\_ver}, \sigma_{d\_hor}$ and $\sigma_{r\_ver}, \sigma_{r\_hor}$ are a function of the form, e.g., a polynomial function:

$$\sigma_{d\_hor} = f(TU\ width)$$

$$\sigma_{d\_ver} = f(TU\ height)$$

$$\sigma_{r\_hor} = f(TU\ width)$$

$$\sigma_{d\_ver} = f(TU\ height)$$

For instance, or $\sigma_{d\_hor} = 0.92 - (TU\ block\ width)*0.025$, $\sigma_{d\_ver} = 0.92 - (TU\ block\ height)*0.025$.

A further generalization is to have to have a weight and/or size dependent on distance based on a function based on TU size or TU width or TU height and a weight and/or size dependent on pixel closeness based on a function based on TU size or TU width or TU height.

Embodiment 5

In this embodiment, $\sigma_d$ and $\sigma_r$ are related to QP value.
Thus the parameters $\sigma_d$ and $\sigma_r$ can be a function of the form:

$$\sigma_d = f_3(QP)$$

$$\sigma_r = f_4(QP)$$

A preferred function $f_4$ is $$\sigma_r = \text{clip}\left(\frac{(QP-17)*2^{\wedge}(\text{bit\_depth}-8)}{8}, 0.01\right),$$

wherein bit_depth corresponds to the video bit depth, i.e., the number of bits used to represent pixels in the video. In a particular case when bit_depth=10, $\sigma_r$=clip((QP−17)/2, 0.01). If both $\sigma_d$ and $\sigma_r$ are derived based on QP, a preferred embodiment is to have different functions $f_3 \neq f_4$.

The QP mentioned here relates to the coarseness of the quantization of transform coefficients. The QP can correspond to a picture or slice QP or even a locally used QP, i.e., QP for TU block.

QP can be defined differently in different standards so that the QP in one standard do not correspond to the QP in another standard. In HEVC, and so far in JEM, six steps of QP change doubles the quantization step. This could be different in a final version of H.266 where steps could be finer or coarser and the range could be extended beyond 51. Thus, in a general embodiment the range parameter is a polynomial model, for example first order model, of the QP. For instance, $\sigma_r$=k×QP+m, wherein k, m are constants.

Another approach is to define a table with an entry for each table where each entry relates to the reconstruction level of at least one transform coefficient quantized with QP to 1. For instance, a table of $\sigma_d$ and/or or a table of $\sigma_r$ are created where each entry, i.e., QP value, relates to the reconstruction level, i.e., pixel value after inverse transform and inverse quantization, for one transform coefficient quantized with QP to 1, e.g., the smallest possible value a quantized transform coefficient can have. This reconstruction level indicates the smallest pixel value change that can originate from a true signal. Changes smaller than half of this value can be regarded as coding noise that the deringing filter should remove.

Yet another approach is to have the weights dependent on quantization scaling matrices, especially relevant are the scaling factors for the higher frequency transform coefficients since ringing artefacts are due to quantization of higher frequency transform coefficients.

Currently, HEVC uses by default a uniform reconstruction quantization (URQ) scheme that quantizes frequencies equally. HEVC has the option of using quantization scaling matrices, also referred to as scaling lists, either default ones, or quantization scaling matrices that are signaled as scaling list data in the sequence parameter set (SPS) or picture parameter set (PPS). To reduce the memory needed for storage, scaling matrices are typically only be specified for 4×4 and 8×8 matrices. For the larger transformations of sizes 16×16 and 32×32, the signaled 8×8 matrix is applied by having 2×2 and 4×4 blocks share the same scaling value, except at the DC positions.

A scaling matrix, with individual scaling factors for respective transform coefficient, can be used to make a different quantization effect for respective transform coefficient by scaling the transform coefficients individually with respective scaling factor as part of the quantization. This enables, for example, that the quantization effect is stronger for higher frequency transform coefficients than for lower frequency transform coefficients. In HEVC, default scaling matrices are defined for each transform size and can be invoked by flags in the SPS and/or the PPS. Scaling matrices also exist in H.264. In HEVC it is also possible to define own scaling matrices in SPS or PPS specifically for each combination of color component, transform size and prediction type (intra or inter mode).

In an embodiment, deringing filtering is performed for at least reconstruction sample values from one transform coefficient using the corresponding scaling factor, as the QP, to determine $\sigma_d$ and/or $\sigma_r$. This could be performed before adding the intra/inter prediction or after adding the intra/inter prediction. Another less complex approach would be to use the maximum or minimum scaling factor, as the QP, to determine $\sigma_d$ and/or $\sigma_r$.

The size of the filter can also be dependent of the QP so that the filter is larger for larger QP than for small QPs.

For instance, the width and/or the height of the filter kernel of the deringing filter is defined for each QP. Another example is to use a first width and/or a first height of the filter kernel for QP values equal or smaller than a threshold and a second, different width and/or a second, different height for QP values larger than a threshold.

Embodiment 6

In this embodiment $\sigma_d$ and $\sigma_r$ are related to video resolution.

The parameters $\sigma_d$ and $\sigma_r$ can be a function of the form:

$\sigma_d = f_5(\text{frame diagonal})$ $\sigma_r = f_6(\text{frame diagonal})$

The size of the filter can also be dependent of the size of the frame. If both $\sigma_d$ and $\sigma_r$ are derived based on frame diagonal, a preferred embodiment is to have different functions $f_5 \neq f_6$.

Small resolutions can contain sharper texture than large resolutions, which can cause more ringing when coding small resolutions. Accordingly, at least one of the spatial parameter and the range parameter can be set such that stronger deringing filtering is applied for small resolutions as compared to large resolutions.

Embodiment 7

According to this embodiment the parameters $\sigma_d$ and $\sigma_r$ are related to QP, TU block size, video resolution and other video properties.

The $\sigma_d$ and $\sigma_r$ can be a function of the form:

$\sigma_d = f_7(\text{QP,TU size,frame diagonal}, \dots)$ $\sigma_r = f_8(\text{QP,TU size,frame diagonal}, \dots)$ Examples of other video properties mentioned above include parameters related to how the prediction is produced. For example, prediction modes, intra or inter prediction, uni prediction or bi-prediction, low delay (IBBB) or random access (IBBBIBBB . . . ) or all intra coding (III), magnitude of negative filter coefficients in intra or inter prediction. Furthermore, parameters related to the transform and the quantization of transform coefficients could be used to determine $\sigma_d$ and/or $\sigma_r$. For example QP, transform block size, bitrate and scaling factors used to quantize low and high frequency transform coefficients differently.

Our preferred embodiment is embodiment 1 combined with the functions $\sigma_d = 0.92 - (\text{TU block width})*0.025$ $\sigma_r = (QP-17)/2$ One approach is to use a 3D LUT using $\sigma_d$ with TU block width or minimum of TU block width and TU block height, such as 4, 8 and larger, QP, such as from 18 to 51, and intensity difference, such as from 0 to 1023 as LUT indices.

The preferred approach use center weight to control the weight for different transform sizes. In that case a 2D LUT is defined with QP and intensity difference as LUT indices for the case of transform width/height 4. Then the other sizes use a larger value of the center coefficient, such that the deblocking filtering becomes weaker.

Embodiment 8

In this embodiment the deringing filter is applied if an inter prediction is interpolated, e.g., not integer pixel motion, or the intra prediction is predicted from reference samples in a specific direction, e.g., non-DC, or that the transform block has non-zero transform coefficients.

Deringing can be applied directly after intra or inter prediction to improve the accuracy of the prediction signal or directly after the transform on residual samples to remove transform effects or on reconstructed samples, i.e., after addition of intra or inter prediction and residual, to remove both ringing effects from prediction and transform or both on intra or inter prediction and residual or reconstruction.

Embodiment 9

The filter weights, $\omega_d$, $\omega_r$ or similarly $\sigma_d$, $\sigma_r$ and/or filter size, such as filter width and/or filter height or aperture, can be individually for intra prediction mode and/or inter prediction mode.

The filter weights and/or filter size can be different in vertical and horizontal direction depending on intra prediction mode or interpolation filter used for inter prediction. For example, if close to horizontal intra prediction is performed the weights could be smaller for the horizontal direction than the vertical direction and for close to vertical intra prediction weights could be smaller for the vertical direction than the horizontal direction. If sub-pel interpolation with an interpolation filter with negative filter coefficients only is applied in the vertical direction the filter weights could be smaller in the horizontal direction than in the vertical direction and if sub-pel interpolation filter with negative filter coefficients only is applied in the horizontal direction the filter weights could be smaller in the vertical direction than in the horizontal direction.

In this embodiment, deringing filtering is preferably only performed in the direction where there is a potential ringing artifact. Hence, this embodiment thereby avoids smoothing of natural structures. If interpolation with filters with negative value is used they can increase or decrease the pixel value close to an edge in a wave-like way. Hence, a smaller weight would preferably mean 0, such that no filtering is done in a direction where you do not think you have any ringing and, thus, also avoid removing natural structures. After coding the residual, the ringing from the interpolation filter could be repaired by the transform at lower QP values but likely remain for higher QP values.

Embodiment 10

The filter weights, $\omega_d$, $\omega_r$ or similarly $\sigma_d$, $\sigma_r$ and/or filter size, such as filter width and/or filter height, can depend on the position of non-zero transform coefficients.

The filter weights and/or filter size can be different in vertical and horizontal direction depending non-zero transform coefficient positions. For example, if non-zero transform coefficients only exist in the vertical direction at the lowest frequency in the horizontal direction the filter weights can be smaller in the horizontal direction than in the vertical direction. Alternatively, the filter is only applied in the vertical direction. Similarly, if non-zero transform coefficients only exist in the horizontal direction at the lowest frequency in the vertical direction the filter weights can be smaller in the vertical direction than in the horizontal direction. Alternatively, the filter is only applied in the horizontal direction.

This embodiment is directed towards preferably only deringing filtering in the direction where there is a potential ringing artifact and, thus, can avoid smoothing natural structures. Ringing artifact appear from the non-flat basis function of the transform.

If you only have a coefficient at the lowest frequency, i.e., DC level, there will not be any ringing artifact from the transform. However, with non-zero coefficients at higher frequencies, the basis function of the transform is a wave and can cause ringing artifacts. For instance, if there is no "wave" in the vertical direction, possibly except at the lowest frequency, i.e., DC level, but there are non-DC coefficients in the horizontal direction, deringing filtering only needs to be applied in the horizontal direction.

The filter weights and/or filter size can also be dependent on existence of non-zero transform coefficients above a certain frequency. The filter weights can be smaller if only low frequency non-zero transform coefficients exist than when high frequency non-zero transform coefficients exist.

Embodiment 11

The filter weights, $\omega_d$, $\omega_r$ or similarly $\sigma_d$, $\sigma_r$ and/or filter size, such as filter weight and/or filter height, can be different for depending on a transform type.

Type of transform can refer to transform skip, KLT like transforms, DCT like transforms, DST transforms, non-separable 2D transforms, rotational transforms and combination of those.

As an example the bilateral filter could only be applied to fast transforms, such as DCT and DST, weight equal to 0 for all other transform types.

Different types of transforms can require smaller weights than others since they cause less ringing than other transforms.

When transform skip is used no transform is applied and, then, ringing will not come from the basis function of the transform. Still there would be some quantization error due to quantization of the residual that benefit from deringing filtering. However, in such a case the weight could be potentially be smaller in order to to avoid overfiltering. More specialized transforms like KLT could possibly also benefit from filtering but likely less strong filtering, i.e., smaller filter weights and $\sigma_d$, $\sigma_r$, than for DCT and DST.

Embodiment 12

The filtering could be implemented as a differential filter which output is clipped, using a Clip function, to be larger than or equal to a minimum (MIN) value and less than or equal to a maximum (MAX) value, and added to the pixel value instead of using a smoothing filter kernel like the Gaussian.

$$I_D(i, j) = I(i, j) + s * \text{Clip}\left(\text{MIN, MAX}, \sum_{k,l} I(k, l) * \omega(i, j, k, l)\right)$$

The differential filter can for example be designed as the difference between a Dirac function and a Gaussian filter kernel. A sign (s) can optionally also be used to make the filtering to enhance edges rather than smooth edges if that is desired for some cases.

The MAX and MIN value can be a function of other parameters as discussed in other embodiments. In principle MIN and MAX can be omitted if a Gaussian filter kernel is used since it will not produce a difference value added to the original value that is larger or smaller than any of the unfiltered values. However, setting the MIN and MAX value to something that is smaller than what difference the filter can produce can limit the amount of filtering of sharp structures. For example, MAX could be set to maximum positive change from bilateral filtering at a specific QP multiplied with a factor that is less than 1. Similarly, MIN could be set to a minimum negative change from bilateral filtering at a specific QP multiplied with a factor that is less than 1.

Another example of parameter could be the minimum of transform width and transform height, which could allow for more change for smaller transform sizes than for larger transform sizes.

The usage of a clipping function can be omitted but allows for an extra freedom to limit the amount of filtering enabling the use of a stronger bilateral filter although limiting how much it is allowed to change the pixel value.

To allow for different MAX and MIN values in the horizontal and the vertical direction the filtering can be described as a vertical filtering part and a horizontal filtering part as shown below:

$$I_D(i, j) = I(i, j) + s * \left( \text{Clip}\left(\text{MIN\_ver, MAX\_ver, } \sum_l I(k, l) * \omega(i, j, k, l)\right) + \text{Clip}\left(\text{MIN\_hor, MAX\_hor, } \sum_k I(k, l) * \omega(i, j, k, l)\right) \right)$$

The MAX_hor, MAX_ver, and MIN_hor and MIN_ver can be a function of other parameters as discussed in other embodiments. For instance, this could allow for more change for smaller transform sizes than for larger transform sizes.

Embodiment 13

One aspect of the present invention is to keep the size of a LUT small. Assume that the $\sigma_d$ and a, parameters are set using $\sigma_d$=0.92−(TU block width)*0.025

$\sigma_r$=(QP−17)/2

Then, the size of the LUT can become quite big. As an example, assume 10 bit accuracy, the absolute difference between two luma values can then be between 0 and 1023. Thus, if the TU block width and the QP are known, 1024 values need to be stored, which in floating point occupies 4096 bytes.

There are four different TU sizes available in HEVC. This means that four look-up tables of size 4096 are needed, which equals 16384 bytes or 16 kilobytes. This can be expensive in a hardware implementation. Therefore, in one embodiment of the invention, Equation 1 is rewritten as $$\omega(i, j, k, l) = e^{\left(-\frac{(i-k)^2+(j-l)^2}{2\sigma_d^2}\right)} e^{\left(-\frac{\|I(i,j)-I(k,l)\|^2}{2\sigma_r^2}\right)} \quad (3)$$

If $\sigma_r$ is kept fixed, one LUT is created for the expression $$e^{\left(-\frac{\|I(i,j)-I(k,l)\|^2}{2\sigma_r^2}\right)},$$

which will occupy 4096 bytes. The first factor of the expression in Equation 3 depends on $\sigma_d$. Since there are four TU sizes, there are four different possible values of on $\sigma_d$. Thus, a LUT of only four values is sufficient to obtain $$e^{\left(-\frac{(i-k)^2+(j-l)^2}{2\sigma_d^2}\right)}.$$

Four values can be stored in 4*4=16 bytes. Thus, in this solution the storage needs for the LUT are lowered from 16384 bytes to 4096+16=4112 bytes, or approximately 4 kB. Now, for the special case with the plus-shaped filter, note that the distance $(i-k)^2+(j-l)^2$ will always be equal to 1 in the case of the four neighbors or 0 in the case of the middle pixel. Equation 3 can then be written as $$\omega(i, j, k, l) = \begin{cases} e^{\left(-\frac{1}{2\sigma_d^2}\right)} e^{\left(-\frac{\|I(i,j)-I(k,l)\|^2}{2\sigma_r^2}\right)} & \text{if } (i, j) \text{ is a neighbor pixel} \\ e^{\left(-\frac{1}{2\sigma_d^2}\right)} e^{\left(\frac{1}{2\sigma_d^2}\right)} & \text{if } (i, j) \text{ is the middle pixel} \end{cases}$$

Please note that $\omega(i, j, k, l)$ is equal to 1 for the middle pixel and in the expression above, the following expression has been used $$1 = e^0 = e^{-\left(\frac{1}{2\sigma_d^2}\right)+\left(\frac{1}{2\sigma_d^2}\right)} = e^{\left(-\frac{1}{2\sigma_d^2}\right)} e^{\left(\frac{1}{2\sigma_d^2}\right)}.$$

This means that $\omega(i, j, k, l)$ can be written as $$\omega(i, j, k, l) = e^{\left(-\frac{1}{2\sigma_d^2}\right)} n(i, j, k, l)$$

where $$n(i, j, k, l) = \begin{cases} e^{\left(-\frac{\|I(i,j)-I(k,l)\|^2}{2\sigma_r^2}\right)} & \text{if } (i, j) \text{ is a neighbor pixel} \\ e^{\left(\frac{1}{2\sigma_d^2}\right)} & \text{if } (i, j) \text{ is the middle pixel} \end{cases}.$$

Equation (2), thus, becomes:

$$I_D = (i, j) = \frac{\sum_{k,l} I(k,l) * e^{\left(-\frac{1}{2\sigma_d^2}\right)} n(i,j,k,l)}{\sum_{k,l} e^{\left(-\frac{1}{2\sigma_d^2}\right)} n(i,j,k,l)}$$

The nominator and denominator can both be divided with $$e^{\left(-\frac{1}{2\sigma_d^2}\right)},$$

which yields $$I_D(i,j) = \frac{\sum_{k,l} I(k,l) * n(i,j,k,l)}{\sum_{k,l} n(i,j,k,l)} \quad (4)$$

If $I_0$ represents the intensity of the middle pixel $I_0=I(i,j)$, the intensity of the neighboring upper pixel is $I_1=I(i,j-1)$, the intensity of the neighboring right pixel is $I_2=I(i+1,j)$, the intensity of the neighboring left pixel is $I_3=I(i-1,j)$ and the intensity of the neighboring lower pixel is $I_4=I(i,j+1)$ Equation 4 can be written as $$I_D(i,j) = \frac{I_0 e^{\left(\frac{1}{2\sigma_d^2}\right)} + I_1 e^{\left(-\frac{\|I_1-I_0\|^2}{2\sigma_r^2}\right)} + I_2 e^{\left(-\frac{\|I_2-I_0\|^2}{2\sigma_r^2}\right)} + I_3 e^{\left(-\frac{\|I_3-I_0\|^2}{2\sigma_r^2}\right)} + I_4 e^{\left(-\frac{\|I_4-I_0\|^2}{2\sigma_r^2}\right)}}{e^{\left(\frac{1}{2\sigma_d^2}\right)} + e^{\left(-\frac{\|I_1-I_0\|^2}{2\sigma_r^2}\right)} + e^{\left(-\frac{\|I_2-I_0\|^2}{2\sigma_r^2}\right)} + e^{\left(-\frac{\|I_3-I_0\|^2}{2\sigma_r^2}\right)} + e^{\left(-\frac{\|I_4-I_0\|^2}{2\sigma_r^2}\right)}}$$

The largest possible value for $$e^{\left(-\frac{\|I_1-I_0\|^2}{2\sigma_r^2}\right)}$$

comes when the difference in intensity is zero, which will give a value of 1.0. Assume that 8 bits are used for the filtering. In such a case, the value $$\text{round}\left(255 * e^{\left(-\frac{\|I_1-I_0\|^2}{2\sigma_r^2}\right)}\right)$$

is stored in the LUT. By doing this, a single byte per LUT entry can be used, which means a reduction from 1024*4+16=4112 bytes down to 1024+16=1040 bytes, or about 1 kByte. Furthermore, the largest possible value for $\sigma_r$ will be 16.5. Assume that the largest QP will be 50, which means that every LUT entry where the difference in intensity is larger than 59 will get a value before rounding smaller than $$255 * e^{\left(-\frac{\|59\|^2}{2*16.5^2}\right)} = 0.4267$$

which will be rounded to zero. Hence it is not necessary to extend the LUT to more than 59. This reduces the LUT size to 60+16=76 bytes or about 0.07 kilobyte. The difference in intensity can be checked against 59, and if it is larger than 59 it is set to 59. The value that will be fetched from the LUT will be 0 since the LUT for 59 is zero, which will be correct.

An alternative is to make the LUT larger up to the nearest power of two minus one, in this case 31. Thus, it is sufficient to check if any bit larger than bit 5 is set. If so, 31 is used, otherwise the value is used as is.

Embodiment 14

The approach as described above can be implemented with filtering in float or integers, such as 8 bit or 16 bit or 32 bit. Typically, a table lookup is used to determine respective weight. Here is an example of filtering in integers that avoids division by doing table lookup of a multiplication factor and shift factor.

$$I_D(i,j) = \left(\left(\sum_{k,l} I(k,l) * \omega(i,j,k,l) * \text{lookup\_M}\left(\sum_{k,l} \omega(i,j,k,l)\right)\right) + \text{roundF}\right) \gg \text{lookup\_Sh}\left(\sum_{k,l} \omega(i,j,k,l)\right)$$

lookup_M determines a multiplication factor to increase the gain of the filtering to close to unity, i.e., weights sum up to 1<<lookup_Sh, given that the "division" using right shift (>>) has the shift value (lookup_Sh) limited to be a multiple of 2. This is to make sure that the accuracy of the replacement of the division is enough by scaling up the filtered sum to match the right shift. In floating point, the sum of a filter should become 1 meaning that the filter do not change the DC value of the signal. In fixed point, the sum of the filter should become 1<<lookupSh. Thus, lookup_M determines a multiplication factor to increase the precision of the approximation of the division given that given that the "division" using right shift (>>) has the shift value (lookup_Sh) limited to be a multiple of 2.

lookup_Sh(A) gives a shift factor that together with the multiplication factor lookup_M gives a sufficient approximation of 1/A. roundF is a rounding factor, which is equal to lookup_Sh>>1. If this approximation is done so that the gain is less or equal to unity the filtering will not increase the value of the filtered pixel outside the value of the pixel values in the neighborhood before the filtering.

Embodiment 15

One approach to reduce the amount of filtering is to omit filtering if the sum of the weights is equal to the weight for the center pixel. If the sum of weights is equal to the weight for the center pixel it means that the weights of the neighbors all are zero and filtering this will give same filtered value as the unfiltered value. Thus a check like this could avoid unnecessary filtering.

Another approach is to consider which weight is needed on neighboring pixels to be able to change the value of the current pixel. Let $\omega_n$ be the sum of neighboring weights and $\omega_{tot}$ be the total sum of weights including the center pixel. Then consider 10 bit data 0 to 1023. Thus, to get an impact of 1, $\omega_n$ must be $$\frac{1023 \times \omega_n}{\omega_{tot}} \geq 1,$$

i.e., $\omega_n \geq \omega_{tot}/1023$ or in fixed point implementation $\omega_n \geq (\omega_{tot}+(1<<9))>>10$. Thus, if the sum of the neighboring weights is below this no filtering needs to be deployed since the filtering will anyway not change the pixel value.

Embodiment 16

The filtering as described in other embodiments can alternatively be performed by separable filtering in horizontal and vertical direction instead for 2D filtering as mostly described in other embodiments.

This could be of interest if it is desired to increase the number of pixels invoked in the filtering. An example is to first apply the horizontal part of the plus shaped filter in the horizontal direction and then apply the vertical part of the plus shaped filter in the vertical direction on the output of the horizontal filtering. This kind of separable filtering may be used to approximate 2D filtering.

Embodiment 17

This embodiment proposes to reduce ringing artifacts within a video encoder and decoder by using a bilateral filter. A small, low-complex bilateral filter is applied on reconstructed samples of the luminance channel after the inverse transform has been performed and the result has been combined with the predicted sample values. The idea is that strong structures, which are expected to have survived the quantization and therefore represent the real signal, are preserved by the filtering, while weak structures, which are likely to be caused by ringing, are suppressed. For complexity reasons the four closest neighboring samples are for filtering, giving a plus-shaped filter as shown in FIG. 4. Although this filter is very small, it may still reduce ringing artifacts. This embodiment proposes a weaker filtering, which reduces ringing artifacts only slightly, but on the other hand affects the signal less. The plus-shaped filter means that Equation 2 only contains five weights; the weight for the center sample, $\omega_C$, the weight for the sample above ($\omega_A$), below ($\omega_B$), left ($\omega_L$) and right ($\omega_R$). Equation 2 can therefore be simplified to to $$I_D(i, j) = \frac{\omega_C I_C + \omega_A I_A + \omega_B I_B + \omega_L I_L + \omega_R I_R}{\omega_C + \omega_A + \omega_B + \omega_L + \omega_R}. \quad (5)$$

Weights for samples outside the transform block are set to zero. The weight $\omega_C=1$ since the center sample has no difference in neither position nor intensity. For the other weights, $(i-k)^2+(j-l)^2$ is always 1, which means that $$\omega = e^{-\frac{1}{2\sigma_d^2} - \frac{|\Delta I|^2}{2\sigma_r^2}}, \quad (6)$$

where $\Delta I$ is the difference in intensity to the center sample. In this implementation, $\sigma_d$ is set based on the width and height of the transform unit, since smaller blocks typically contain more detail and therefore benefit from stronger filtering.

$$\sigma_d = p - \frac{\min\{TU \text{ block width}, TU \text{ block height}, 16\}}{40},$$

where p=0.92 for intra predicted blocks and p=0.72 for inter predicted block. The motivation for this difference in p is that inter predicted blocks refer to previous frames where samples have already been through the bilateral filter at least once, so a weaker filter is used to avoid overfiltering. The range parameter $\sigma_r$ is based on the QP used for the current block, $$\sigma_r = \max\left\{\frac{QP-17}{2}, 0.01\right\}.$$

The motivation for using QP to control the filter strength is that for a high QP, i.e., a low bit rate, there will be a lot of ringing/quantization artifacts, justifying stronger filtering. At higher bit rates, there are less ringing artifacts to correct, and the filtering is weakened with lower QP values until it is turned off completely for QP<18. Furthermore, the filter is turned off for blocks that do not have any non-zero transform coefficients and for inter predicted blocks of size 16×16 and larger. This bilateral filter is applied to each transform block directly after adding the reconstructed residual values to the predicted values for the block, in both the encoder and the decoder. As a result of this, subsequent intra-coded blocks can predict from the sample values that have been filtered with the bilateral filter. It also means that the filter is applied before deblocking, sample adaptive offset filtering and adaptive loop filtering. In an optional implementation, the bilateral filter operation is also included in the rate-distortion decisions in the encoder, in order to select the modes which are best after filtering.

A brute force implementation would calculate the four weights $\omega_A$, $\omega_B$, $\omega_L$, $\omega_R$ using Equation 6 and then get the filtered sample using Equation 5. However, in such a case, the calculation of the weights becomes a bottleneck, particularly the four exponential functions. In order to reduce the number of calculations, a LUT can be used, storing all possible outcomes of Equation 6 in a three-dimensional array $\omega$=LUT($\sigma_d$, $\sigma_r$, $|\Delta I|$). Since $\sigma_d$ can take six different values, a, can take 34 different values, and $|\Delta I|$ can take 1023 different values assuming 10 bit luma data, the entire LUT can become over 200 k values. Thus, while such a LUT may solve the computational complexity issue, its storage requirements may be too high for some implementations. The size of this LUT can, though, be reduced. Multiply the LUT entry from Equation 6 by the value s, where $$S = \frac{e^{-\frac{1}{2\sigma_r^2}}}{e^{-\frac{1}{2\sigma_d^2}}},$$

the result will be $$\omega_{new} = \omega s = \frac{e^{-\frac{1}{2\sigma_x^2}}}{e^{-\frac{1}{2\sigma_d^2}}} e^{-\frac{1}{2\sigma_d^2} - \frac{|\Delta I|^2}{2\sigma_I^2}} = e^{-\frac{1}{2\sigma_x^2} - \frac{|\Delta I|^2}{2\sigma_I^2}}.$$

It is therefore possible to effectively change from $\sigma_d$ to $\sigma_x$ by multiplying each LUT output by a constant. This means that we can use a fixed value of $\sigma_d$=0.82 (corresponding to 4×4 pixel intra blocks) in the LUT, which can instead be made two-dimensional, $\omega$=LUT ($\sigma_r$, |$\Delta$I|), reducing the size of the LUT by a factor of six. The filtered value is instead calculated using $$I_D(i,j) = \frac{I_C + s\omega_A I_A + s\omega_B I_B + s\omega_L I_L + s\omega_R I_R}{1 + s\omega_A + s\omega_B + s\omega_L + s\omega_R}.$$

To reduce the number of multiplications, it is noted that this is equivalent to $$I_D(i,j) = \frac{s^{-1}I_C + \omega_A I_A + \omega_B I_B + \omega_L I_L + \omega_R I_R}{s^{-1} + \omega_A + \omega_B + \omega_L + \omega_R}, \quad (7)$$

which is equal to Equation 5 with the center weight value changed from 1.0 to $s^{-1}$. In a fixed point implementation, the value 65 is used to represent 1.0, making the largest LUT value 31, so five bits are enough for storage. The values for the center weight $s^{-1}$ then become as shown in Table I below.

TABLE I

Center weight values ($s^{-1}$)

| Block type | min (TU block width, TU block height, 16) | | |
|---|---|---|---|
| | 4 | 8 | 16 |
| Intra | 65 | 81 | 196 |
| Inter | 113 | 196 | not used |

Since Equation 6 is monotonously decreasing in |$\Delta$I|, if LUT($\sigma_r$, |$\Delta$I|) is quantized to zero in five bits for a certain |$\Delta I_{limit}$|, LUT ($\sigma_r$, x)=0 for all x≥|$\Delta$Ilimit|. Thus, accessing the LUT using LUT($\sigma_r$, min{$\Delta$I, $\Delta I_{limit}$}) gives the same result as if LUT($\sigma_r$, |$\Delta$I|), and the values if LUT ($\sigma_r$, $\Delta I_{limit}$+1) ... LUT ($\sigma_r$, $\Delta_{limit}$+1023), which are all zero, will never be accessed. By keeping track of $\Delta I_{limit}$ for every $\sigma_r$ using a small table, there is no need to store these zero values. This dramatically reduces the storage demands since the average number of stored values per $\sigma_r$ goes down from 1023 to 102. Therefore ⌈102*34*5/8⌉=2168 bytes are sufficient to store the LUT entries, where 34 is the number of possible values of $\sigma_r$. Including 34 bytes for the table to store $\Delta I_{limit}$, the total number of bytes used for the LUT becomes 2202. When filtering a sample I(i, j), the absolute difference |$\Delta$I|=|I(i, j)−I(i+1,j)| is used for the LUT look-up of the right weight $\omega_R$. When filtering the next sample, I(i+1, j), the same absolute difference |$\Delta$I|=|I(i+1, j)−I(i, j)| is used again, this time to calculate the left weight $\omega_L$. Since $\sigma_r$ does not change inside a block, weight $\omega_R$ for sample (i, j) will be the same as weight $\omega_L$ for sample (i+1, j). By reusing the weight from the left and above sample, it is possible to lower the number of LUT lookups to two lookup operations per sample.

The division in Equation 7 can be implemented efficiently on a CPU using an integer division instruction. Since these instructions round down, half of the denominator is added to the nominator before the division. However, for hardware implementations, an integer division may be expensive in terms of silicon area. In these cases, rather than dividing by n, it may be better to multiply by $2^k$/n, which can be stored in a LUT called divLUT(n), and then right shift k steps. To preserve accuracy, k needs to be larger for larger values of n, and how much larger is stored in another LUT called shiftLUT(n). The maximum size of the nominator will determine how many bits each value of divLUT will have to be. Given 10-bit luma samples, the largest value of $\omega_A I_A$ is equal to 32×1023=32736, and the same goes for the other terms, making the largest possible nominator in Equation 7 quite high. By instead rewriting Equation 7 as $$I_D(i,j) = I_C + \frac{\omega_A \Delta I_A + \omega_B \Delta I_B + \omega_L \Delta I_L + \omega_R \Delta I_R}{s^{-1} + \omega_A + \omega_B + \omega_L + \omega_R},$$

the largest possible nominator becomes much smaller. This is due to the fact that $\Delta$I and $\omega$ cannot be large simultaneously; if the intensity difference is big, the weight will be small. In an implementation, $\omega\Delta$I≤1300, and the maximum nominator size is therefore 5200. This means that the largest number stored in divLUT is 214, requiring 15 bits. Since the value 0 is never used in divLUT, this value can be used to represent 214, lowering the bit count to 14 bits per value. The shift value to use varies between 14 and 25 meaning that we need to store 4-bit values (k−14) in shiftLUT. The number of entries in divLUT and shiftLUT is given by the maximum denominator n, which is 196+4*31=320. Given that the denominator is always at least $s^{-1}$≥65, only the last 320−64=256 values need to be stored, requiring 256*(14+ 4)/8=576 bytes of storage. In summary, 2202+576=2778 bytes of LUT storage is sufficient for an efficient hardware implementation. If care is taken when doing rounding, it is possible to get the division-free implementation to match Equation 5 bit-exactly. Hence for CPU implementations, it may be easier to use the integer division instruction, while ASIC implementations can use the division-free version, maintaining compatibility.

The proposed filter was implemented in JEM 5.0.1, and tested according to the JVET common test conditions [2]. The main indicator of compression performance is the average BD-rate [3] computed over the 21 sequences defined in the test conditions. Complexity is measured as run time. The results for still image coding (intra) and standard random access video coding (inter) are displayed in Table II.

TABLE II

Performance

| | BD-rate | Encoder complexity | Decoder complexity |
|---|---|---|---|
| Intra | −0.4% | +6% | +5% |
| Inter | −0.5% | +3% | +0% |

This implementation embodiment proposes the use of a bilateral filter as a coding tool for video coding. The filtering is applied directly after the inverse transformed residual has been added to the prediction, and can therefore be used both for spatial and temporal prediction of subsequent blocks. A LUT based implementation is used to lower computational complexity. It is also demonstrated how the filter can be implemented without division for hardware-friendlyness. The BD rate is reduced by 0.5% for video data, while increasing the encoding time by 3% and the decoding time by 0%.

Embodiment 18

In this embodiment one set of weights, $\omega_d$, $\omega_r$ or similarly $\sigma_d$, $\sigma_r$, and/or filter size is used for blocks that have been intra predicted and another set of weights and/or filter size is used for blocks that have been inter predicted. Typically the weights are set to reduce the amount of filtering for blocks, which have been predicted with higher quality compared to blocks that have been predicted with lower quality. Since blocks that have been inter predicted typically has higher quality than blocks have been intra predicted they are filtered less to preserve the prediction quality.

One example to have one $\omega_d$ or similarly $\sigma_d$ for blocks that have been intra predicted and a smaller $\omega_d$ or similarly $\sigma_d$ for blocks that have been inter predicted.

Example weights for intra predicted blocks are:

$$\sigma_d = 0.92 - \min(\text{TU block width}, \text{TU block height}) \times 0.025$$

Example weights for inter predicted blocks are:

$$\sigma_d = 0.72 - \min(\text{TU block width}, \text{TU block height}) \times 0.025$$

Embodiment 19

In this embodiment one set of weights, $\omega_d$, $\omega_r$ or similarly $\sigma_d$, $\sigma_r$, and/or filter size depends on picture type or slice type.

One example is to use one set of weights for intra pictures or slices and another set weights are used for inter pictures or slices. One example to have one $\omega_d$ or similarly $\sigma_d$ for pictures or slices that have only been intra predicted and a smaller $\omega_d$ or similarly $\sigma_d$ for other pictures slices.

Example weights for intra pictures or slices, e.g., I_SLICE, are:

$$\sigma_d = 0.92 - \min(\text{TU block width}, \text{TU block height}) \times 0.025$$

Example weights for inter pictures or slices, e.g., P_SLICE, B_SLICE, are:

$$\sigma_d = 0.72 - \min(\text{TU block width}, \text{TU block height}) \times 0.025$$

B slices, i.e., bi-prediction allowed, that typically have better prediction quality than P slices, only single prediction, can in another variant of this embodiment have a smaller weight than P slices.

For instance, the weights for intra pictures or slices, e.g., I_SLICE, are:

$$\sigma_d = 0.92 - \min(\text{TU block width}, \text{TU block height}) \times 0.025$$

The weights for B pictures or slices, e.g., B_SLICE, are:

$$\sigma_d = 0.82 - \min(\text{TU block width}, \text{TU block height}) \times 0.025$$

The weights for P pictures or slices, e.g., P_SLICE, are:

$$\sigma_d = 0.72 - \min(\text{TU block width}, \text{TU block height}) \times 0.025$$

In another variant, generalized B-slices that are used instead of P-slices for uni-directional prediction can have same weight as P-slices. "Normal" B-slices that can predict from both future and past can have a larger weight than generalized B-slices. Example weights for "normal" B-slices are:

$$\sigma_d = 0.82 - \min(\text{TU block width}, \text{TU block height}) \times 0.025$$

Embodiment 20

In this embodiment one set of weights $\omega_d$, $\omega_r$ or similarly $\sigma_d$, $\sigma_r$, and/or filter size is used for intra pictures or slices and another set weights are used for inter pictures or slices that are used for reference for prediction of other pictures and a third set of weights are used for inter pictures or slices that not are used for reference for prediction of other pictures.

One example is to have one $\omega_d$ or similarly $\sigma_d$ for pictures or slices that have only been intra predicted and a somewhat smaller $\omega_d$ or similarly $\sigma_d$ for pictures or slices that have been inter predicted and are used for predicting other pictures and smallest $\omega_d$ or similarly $\sigma_d$ for pictures or slices that have been inter predicted but not are used for prediction of other pictures, i.e., non-reference picture or slice.

Example weights for intra pictures or slices, e.g., I_SLICE, are:

$$\sigma_d = 0.92 - \min(\text{TU block width}, \text{TU block height}) \times 0.025$$

Example weights for inter pictures or slices, e.g., P_SLICE, B_SLICE, that not are used for reference, non-reference picture or slice, are:

$$\sigma_d = 0.82 - \min(\text{TU block width}, \text{TU block height}) \times 0.025$$

Example weights for inter pictures or slices, e.g., P_SLICE, B_SLICE, that are used for reference are:

$$\sigma_d = 0.72 - \min(\text{TU block width}, \text{TU block height}) \times 0.025$$

Embodiment 21

To enable some adaptivity with respect to the used weights, i.e., at least one of or all of $\omega_d$, $\omega_r$ or similarly $\sigma_d$, $\sigma_r$, an encoder can select which values of the weights to use and encode them in sequence parameter sets (SPS), picture parameter sets (PPS) or slice headers. A decoder can then decode the values of the weights to be used for filtering respective picture or slice.

In a variant of this embodiment specific values of the weights are given for blocks that are intra predicted compared to blocks that are inter predicted are encoded in SPS, PPS or slice header. A decoder can then decode the values of the weights to be used for blocks that are intra predicted and the values of the weights to be used for blocks that are inter predicted.

An aspect of the embodiments relates to a device for filtering a picture of a video signal. The picture comprises pixels and each pixel is associated with a pixel value. The device is configured to modify a pixel value of a pixel by a weighted combination of the pixel value and at least one spatially neighboring pixel value in a filtering that depends on a pixel distance between the pixel and a neighboring pixel and on a pixel value difference between the pixel value and a neighboring pixel value of the neighboring pixel, and is controlled by a spatial parameter and a range parameter. In this aspect, the spatial parameter depends on at least one of a width of a transform block and a height of the transform block, and on at least one of a prediction type of a block of pixels in the picture, the block of pixels comprises the pixel; a picture type of the picture; and a slice type of a slice in the picture, the slice comprises the pixel.

In an embodiment, the spatial parameter $\sigma_d = p - A \times 0.025$. In this embodiment, A is selected from one of a minimum of the width of the transform block and the height of the transform block; a maximum of the width of the transform block and the height of the transform block; a mean of the width of the transform block and the height of the transform block; the width of the transform block; and the height of the transform block. In this embodiment, p is defined based on the at least one of the prediction type, the picture type and the slice type.

In an embodiment, A is the minimum of the width of the transform block and the height of the transform block.

In an embodiment, p is larger if the prediction type is intra prediction than if the prediction type is inter prediction.

In a particular embodiment, p is 0.92 if the prediction type is intra prediction and 0.72 if the prediction type is inter prediction.

In an embodiment, p is larger if the picture or slice type is intra picture or slice than if the picture or slice type is inter picture or slice.

In a particular embodiment, p is 0.92 if the picture or slice type is intra picture or slice and 0.72 if the picture or slice type is inter picture or slice.

In another particular embodiment, p is 0.92 if the picture or slice type is intra picture or slice, 0.82 if the picture or slice type is B inter picture or slice and 0.72 if the picture or slice type is P inter picture or slice.

In a further particular embodiment, p is 0.92 if the picture or slice type is intra picture or slice, 0.82 if the picture or slice type is inter picture or slice and not used for reference and 0.72 if the picture or slice type is inter picture or slice and used for reference.

In an embodiment, the range parameter $\sigma_r$ depends on one of a quantization parameter of the picture, a quantization parameter of the slice, and a quantization parameter of the block of pixels.

In a particular embodiment, the range parameter $$\sigma_r = \text{clip}\left(\frac{(QP-17) \times 2^{(bit\_depth-8)}}{8}, 0.01\right)$$

and bit_depth represents a bit depth of the video signal and QP represents one of the quantization parameter of the picture, the quantization parameter of the slice and the quantization parameter of the block of pixels.

In a particular embodiment, the range parameter $\sigma_r = (QP-17)/2$.

In an embodiment, the device is configured to modify the pixel value of the pixel by the weighted combination of the pixel value and the at least one spatially defined pixel value using respective weights that depend on the spatial parameter and the range parameter.

In a particular embodiment, the respective weights $$\omega(i, j, k, l) = e^{\left(-\frac{(i-k)^2 + (j-l)^2}{2\sigma_d^2}\right)} e^{\left(-\frac{\|I(i,j) - I(k,j)\|^2}{2\sigma_r^2}\right)} \cdot I(k, l)$$

represents a pixel value of pixel (k,l), I(i,j) represents a pixel value of pixel (i,j), $\sigma_d$ represents the spatial parameter and a, represents the range parameter.

In an embodiment, the device is configured to retrieve the respective weights from a look-up table, LUT, comprising pre-computed weights using i) the range parameter $\sigma_r$ or the quantization parameter and ii) a difference in pixel values ΔI as LUT index.

In an embodiment, the device is configured to modify the pixel value by the weighted combination of the pixel value and the at least one spatially neighboring pixel value using a bilateral deringing filter outputting a modified pixel value $$I_D(i, j) = \frac{\sum_{k,l} I(k, l) \times \omega(i, j, k, l)}{\sum_{k,l} \omega(i, j, k, l)} \cdot I(k, l)$$

represents a pixel value of pixel (k,l), I(i,j) represents a pixel value of pixel (i,j), $\sigma_d$ represents the spatial parameter and a, represents the range parameter.

In an embodiment, the device is configured to modify the pixel value by the weighted combination of the pixel value and the at least one spatially neighboring pixel value using a bilateral deringing filter with a plus sign shaped filter aperture outputting the modified pixel value $$I_D(i, j) = \frac{\sum_{k,l} I(k, l) \times \omega(i, j, k, l)}{\sum_{k,l} \omega(i, j, k, l)}.$$

k=i−1,i,i+1 and l=j−1,j,j+1 with the proviso that when k=i−1,i+1 then l=j and when l=j−1,j+1 then k=i.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 9:
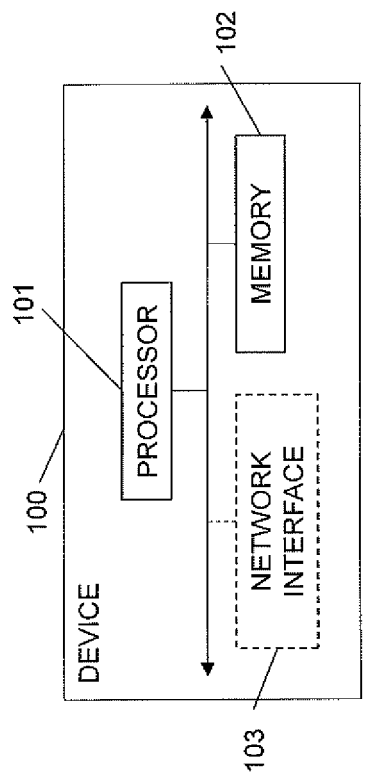
FIG. 9 is a schematic block diagram of a device for filtering according to an embodiment.

FIG. 9 is a schematic block diagram illustrating an example of a device 100 for filtering a picture based on a processor-memory implementation according to an embodiment. In this particular example, the device 100 comprises a processor 101, such as processing circuitry, and a memory 102. The memory 102 comprises instructions executable by the processor 101.

In an embodiment, the processor 101 is operative to modify the pixel value of the pixel by the weighted combination of the pixel value and the at least one spatially neighboring pixel value in the filtering that depends on the pixel distance between the pixel and the neighboring pixel and on the pixel value difference between the pixel value and the neighboring pixel value of the neighboring pixel, and is controlled by the spatial parameter and the range parameter.

Optionally, the device 100 may also include a communication circuit, represented by a network interface 103 in FIG. 9. The network interface 103 may include functions for wired and/or wireless communication with other devices and/or network nodes in a wired or wireless communication network. In a particular example, the network interface 103 may be based on radio circuitry for communication with one or more other network devices or user equipment, including transmitting and/or receiving information. The network interface 103 may be interconnected to the processor 101 and/or memory 102. By way of example, the network interface 103 may include any of the following: a receiver, a transmitter, a transceiver, input/output (I/O) circuitry, input port(s) and/or output port(s).

Figure 10:
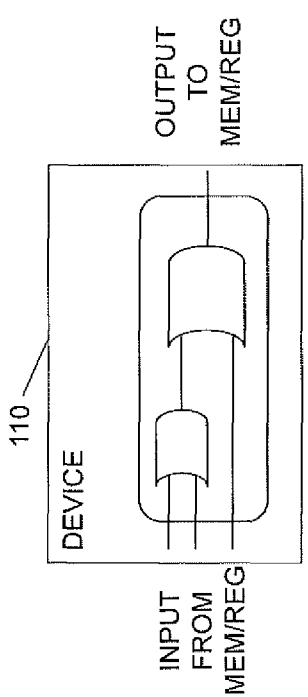
FIG. 10 is a schematic block diagram of a device for filtering according to another embodiment.

FIG. 10 is a schematic block diagram illustrating another example of a device 110 for filtering a picture based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 11:
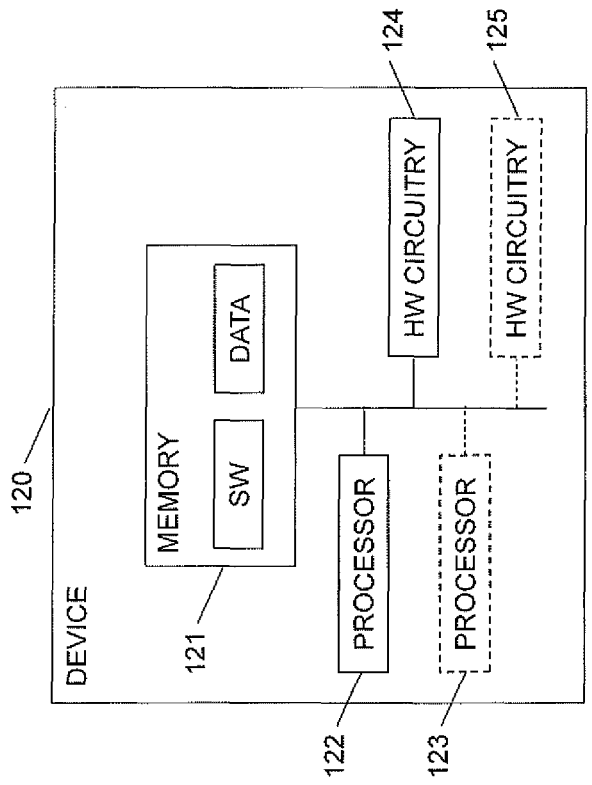
FIG. 11 is a schematic block diagram of a device for filtering according to a further embodiment.

FIG. 11 is a schematic block diagram illustrating yet another example of a device 120 for filtering a picture based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 12:
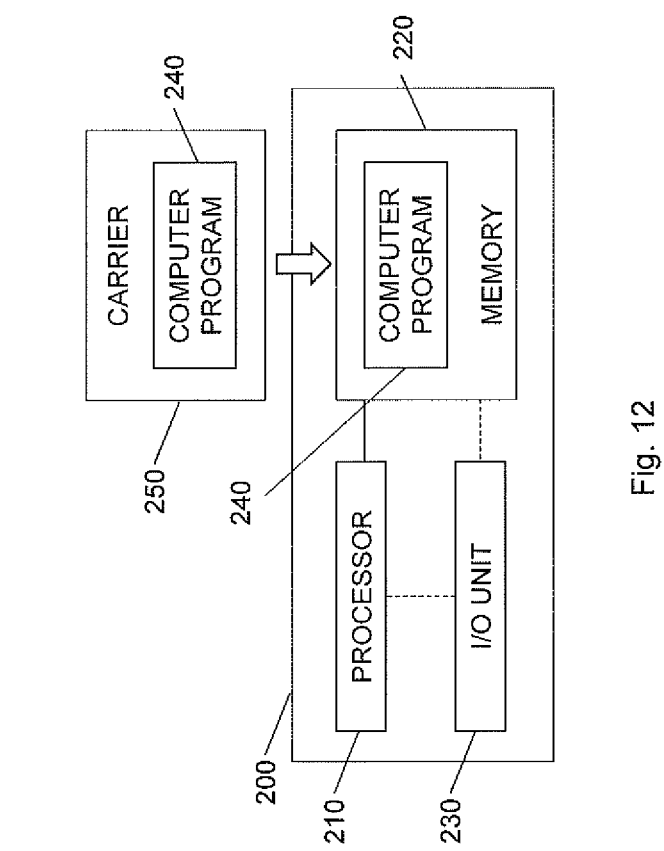
FIG. 12 is a schematic block diagram of a computer program based implementation of an embodiment.

FIG. 12 is a schematic diagram illustrating an example of a device 200 for filtering a picture according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as a video sequence to be encoded, an encoded bitstream and/or reconstructed or decoded pictures of a video sequence.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to modify a pixel value of a pixel by a weighted combination of the pixel value and at least one spatially neighboring pixel value in a filtering that depends on a pixel distance between the pixel and a neighboring pixel and on a pixel value difference between the pixel value and a neighboring pixel value of the neighboring pixel, and is controlled by a spatial parameter and a range parameter. The spatial parameter depends on at least one of a width of a transform block and a height of the transform block, and on at least one of a prediction type of a block of pixels in the picture, the block of pixels comprises the pixel; a picture type of the picture; and a slice type of a slice in the picture, the slice comprises the pixel.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a device 200 for execution by the processing circuitry 210 thereof.

The flow diagram or diagrams presented herein may be regarded as a computer flow diagram or diagrams, when performed by one or more processors. A corresponding device for filtering a picture may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 13:
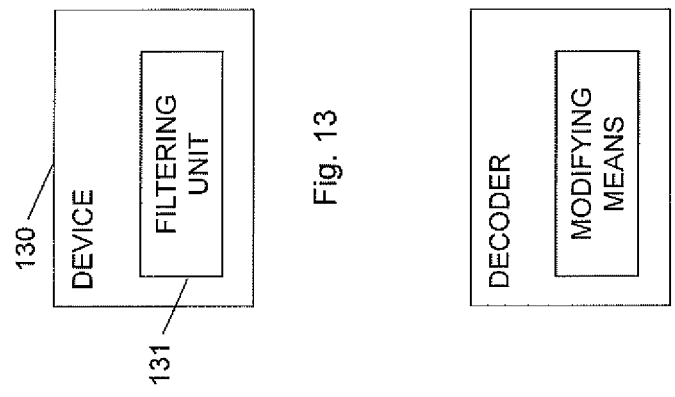
FIG. 13 is a schematic block diagram of a device for filtering according to yet another embodiment.

FIG. 13 is a schematic block diagram of a device 130 for filtering a picture of a video signal. The picture comprises pixels and each pixel is associated with a pixel value. The device 130 comprises a filtering unit 131 for filtering a pixel by modifying a pixel value of the pixel by a weighted combination of the pixel value and at least one spatially neighboring pixel value in a filtering that depends on a pixel distance between the pixel and a neighboring pixel and on a pixel value difference between the pixel value and a neighboring pixel value of the neighboring pixel, and is controlled by a spatial parameter and a range parameter. The spatial parameter depends on at least one of a width of a transform block and a height of the transform block, and on at least one of a prediction type of a block of pixels in the picture, the block of pixels comprises the pixel; a picture type of the picture; and a slice type of a slice in the picture, the slice comprises the pixel.

An embodiment relates to a video encoder comprising a device for filtering a picture of the embodiments.

Figure 7:
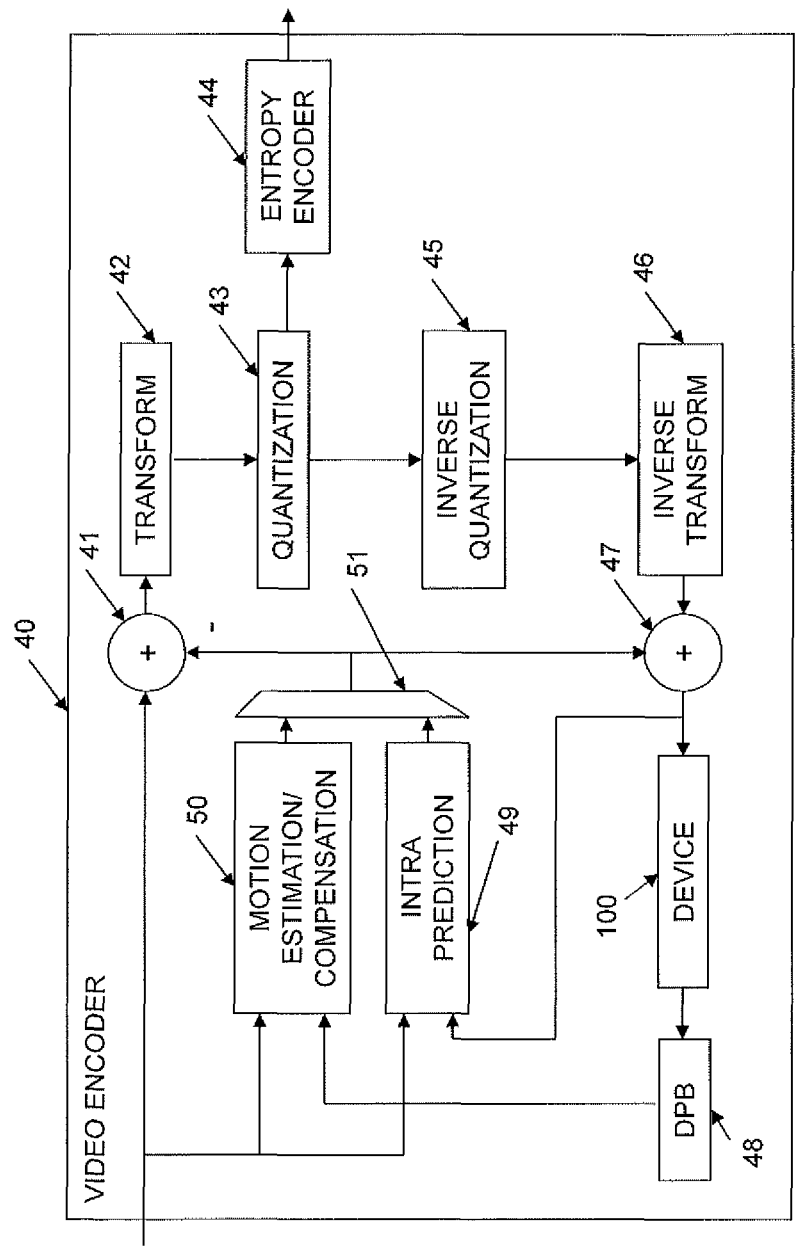
FIG. 7 schematically illustrates a video encoder according to an embodiment.

FIG. 7 is a schematic block diagram of a video encoder 40 according to an embodiment.

A current sample block, also referred to as pixel block or block of pixels, is predicted by performing a motion estimation by a motion estimator 50 from already encoded and reconstructed sample block(s) in the same picture and/or in reference picture(s). The result of the motion estimation is a motion vector in the case of inter prediction. The motion vector is utilized by a motion compensator 50 for outputting an inter prediction of the sample block.

An intra predictor 49 computes an intra prediction of the current sample block. The outputs from the motion estimator/compensator 50 and the intra predictor 49 are input in a selector 51 that either selects intra prediction or inter prediction for the current sample block. The output from the selector 51 is input to an error calculator in the form of an adder 41 that also receives the sample values of the current sample block. The adder 41 calculates and outputs a residual error as the difference in sample values between the sample block and its prediction, i.e., prediction block.

The error is transformed in a transformer 42, such as by a discrete cosine transform (DCT), and quantized by a quantizer 43 followed by coding in an encoder 44, such as by an entropy encoder. In inter coding, also the estimated motion vector is brought to the encoder 44 for generating the coded representation of the current sample block.

The transformed and quantized residual error for the current sample block is also provided to an inverse quantizer 45 and inverse transformer 46 to reconstruct the residual error. This residual error is added by an adder 47 to the prediction output from the motion compensator 50 or the intra predictor 49 to create a reconstructed sample block that can be used as prediction block in the prediction and coding of other sample blocks. This reconstructed sample block is first processed by a device 100 for filtering a picture according to the embodiments in order to suppress deringing artifacts. The modified, i.e., filtered, reconstructed sample block is then temporarily stored in a Decoded Picture Buffer (DPB) 48, where it is available to the intra predictor 49 and the motion estimator/compensator 50.

If the deringing filtering instead is applied following inverse transform, the device 100 is preferably instead arranged between the inverse transformer 46 and the adder 47.

An embodiment relates to a video decoder comprising a device for filtering a picture according to the embodiments.

Figure 8:
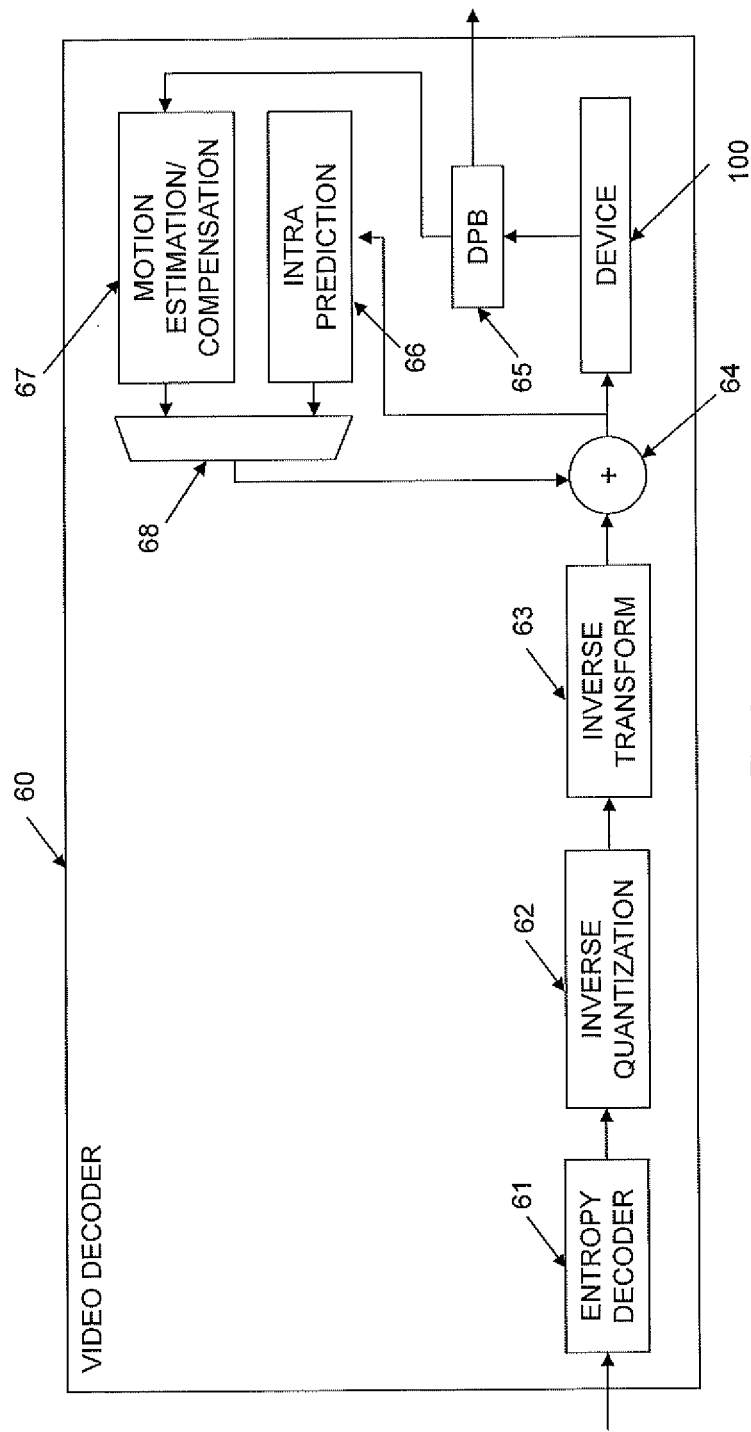
FIG. 8 schematically illustrates a video decoder according to an embodiment.

FIG. 8 is a schematic block diagram of a video decoder 60 comprising a device 100 for filtering a picture according to the embodiments. The video decoder 60 comprises a decoder 61, such as entropy decoder, for decoding a bitstream comprising an encoded representation of a sample block to get a quantized and transformed residual error. The residual error is dequantized in an inverse quantizer 62 and inverse transformed by an inverse transformer 63 to get a decoded residual error.

The decoded residual error is added in an adder 64 to the sample prediction values of a prediction block. The prediction block is determined by a motion estimator/compensator 67 or intra predictor 66, depending on whether inter or intra prediction is performed. A selector 68 is thereby interconnected to the adder 64 and the motion estimator/compensator 67 and the intra predictor 66. The resulting decoded sample block output from the adder 64 is input to a device 100 for filtering a picture in order to suppress and combat any ringing artifacts. The filtered sample block enters a DPB 65 and can be used as prediction block for subsequently decoded sample blocks. The DPB 65 is thereby connected to the motion estimator/compensator 67 to make the stored sample blocks available to the motion estimator/compensator 67. The output from the adder 64 is preferably also input to the intra predictor 66 to be used as an unfiltered prediction block. The filtered sample block is furthermore output from the video decoder 60, such as output for display on a screen.

If the deringing filtering instead is applied following inverse transform, the device 100 is preferably instead arranged between the inverse transformer 63 and the adder 64.

One idea of embodiments of the present invention is to introduce a deringing filter into the Future Video Codec, i.e., the successor to HEVC. The deringing filter proposed in this invention is preferably evolved from a bilateral filter. The present invention proposes some simplifications and how to adapt the filtering to local parameters in order to improve the filtering performance.

Another aspect of the embodiments defines a filter, for filtering a picture of a video signal. The picture comprises pixels, each pixel being associated with a pixel value. The filter is configured to modify a pixel value by a weighted combination of the pixel value and at least one spatially neighboring pixel value. The filtering is controlled by two parameters $\sigma_d$ and $\sigma_r$. In an embodiment, $\sigma_d$ depends on a pixel distance between the pixel value and the neighboring pixel value. In an embodiment, $\sigma_r$ depends on a pixel value difference between the pixel value and the neighboring pixel value. At least one of the parameters $\sigma_d$ and $\sigma_r$ also depends on at least one of: quantization parameter, quantization scaling matrix, transform width, transform height, picture width, picture height, a magnitude of a negative filter coefficient used as part of inter/intra prediction.

Another aspect of the embodiments defines filter, for filtering a picture of a video signal. The picture comprises pixels, each pixel being associated with a pixel value. The filter comprising a modifying module for modifying a pixel value by a weighted combination of the pixel value and at least one spatially neighboring pixel value. The filtering is controlled by two parameters $\sigma_d$ and $\sigma_r$. In an embodiment, $\sigma_d$ depends on a pixel distance between the pixel value and the neighboring pixel value. In an embodiment, $\sigma_r$ depends on a pixel value difference between the pixel value and the neighboring pixel value. At least one of the parameters $\sigma_d$ and $\sigma_r$ also depends on at least one of: quantization parameter, quantization scaling matrix, transform width, transform height, picture width, picture height, a magnitude of a negative filter coefficient used as part of inter/intra prediction.

Figure 14:
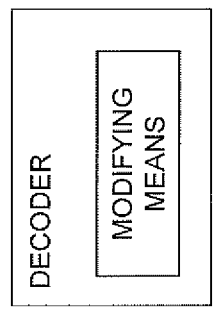
FIG. 14 is a schematic block diagram of a decoder according to an embodiment.

A decoder could also comprise a modifying means, see FIG. 14. The modifying means is configured to modify a pixel value by a weighted combination of the pixel value and at least one spatially neighboring pixel value. The filtering is controlled by two parameters $\sigma_d$ and $\sigma_r$. In an embodiment, $\sigma_d$ depends on a pixel distance between the pixel value and the neighboring pixel value. In an embodiment, $\sigma_r$ depends on a pixel value difference between the pixel value and the neighboring pixel value. At least one of the parameters $\sigma_d$ and $\sigma_r$ also depends on at least one of: quantization parameter, quantization scaling matrix, transform width, transform height, picture width, picture height, a magnitude of a negative filter coefficient used as part of inter/intra prediction.

The filter may be implemented in a video encoder and a video decoder. It may be implemented in hardware, in software or a combination of hardware and software. The filter may be implemented in, e.g., comprised in, user equipment, such as a mobile telephone, tablet, desktop, netbook, multimedia player, video streaming server, set-top box or computer.

Further, a data processing system, such as illustrated in FIG. 9, can be used to implement the filter. The data processing system includes at least one processor that is further coupled to a network interface via an interconnect. The at least one processor is also coupled to a memory via the interconnect. The memory can be implemented by a hard disk drive, flash memory, or read-only memory and stores computer-readable instructions. The at least one processor executes the computer-readable instructions and implements the functionality described above. The network interface enables the data processing system to communicate with other nodes in a network. Alternative embodiments of the present invention may include additional components responsible for providing additional functionality, including any functionality described above and/or any functionality necessary to support the solution described herein.

A further aspect of the embodiments defines a computer program for a filter comprising a computer program code which, when executed, causes the filter to modify a pixel value by a weighted combination of the pixel value and at least one spatially neighboring pixel value. The filtering is controlled by two parameters $\sigma_d$ and $\sigma_r$. In an embodiment, $\sigma_d$ depends on a pixel distance between the pixel value and the neighboring pixel value. In an embodiment, $\sigma_r$ depends on a pixel value difference between the pixel value and the neighboring pixel value. At least one of the parameters $\sigma_d$ and $\sigma_r$ also depends on at least one of: quantization parameter, quantization scaling matrix, transform width, transform height, picture width, picture height, a magnitude of a negative filter coefficient used as part of inter/intra prediction.

A further aspect of the embodiments defines a computer program product comprising a computer program for a filter and a computer readable means on which the computer program for a filter is stored.

A further embodiment relates to a user equipment comprising device for filtering a picture, a video encoder and/or a video decoder according to the embodiments. In a particular embodiment, the user equipment is selected from a group consisting of a mobile telephone, a tablet, a desktop, a netbook, a multimedia player, a video streaming server, a set-top box and a computer.

The device for filtering a picture, the video encoder and/or video decoder of the embodiments may alternatively be implemented in a network device or equipment being or belonging to a network node in a communication network. Such a network equipment may be a device for converting video according to one video coding standard to another video coding standard, i.e., transcoding. The network equipment can be in the form of or comprised in a radio base station, a Node-B or any other network node in a communication network, such as a radio-based network.

It is becoming increasingly popular to provide computing services, hardware and/or software, in network equipment, such as network devices, nodes and/or servers, where the resources are delivered as a service to remote locations over a network. By way of example, this means that functionality, as described herein, can be distributed or re-located to one or more separate physical devices, nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

Figure 15:
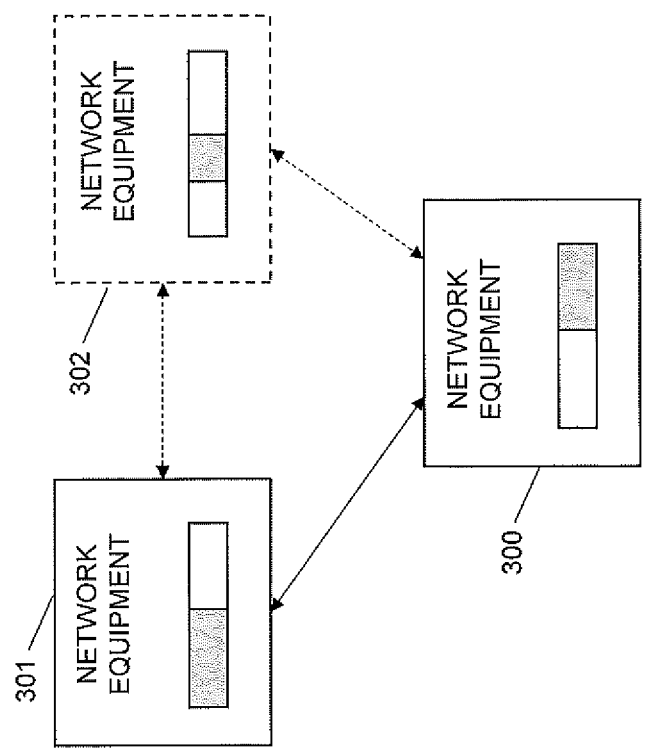
FIG. 15 a schematic diagram of a distributed implementation in network equipment according to an embodiment.

FIG. 15 is a schematic diagram illustrating an example of how functionality can be distributed or partitioned between different network equipment in a general case. In this example, there are at least two individual, but interconnected network equipment 300, 301, which may have different functionalities, or parts of the same functionality, partitioned between the network equipment 300, 301. There may be additional network devices 302 being part of such a distributed implementation. The network equipment 300, 301, 302 may be part of the same wireless or wired communication system, or one or more of the network devices may be so-called cloud-based network devices located outside of the wireless or wired communication system.

Figure 16:
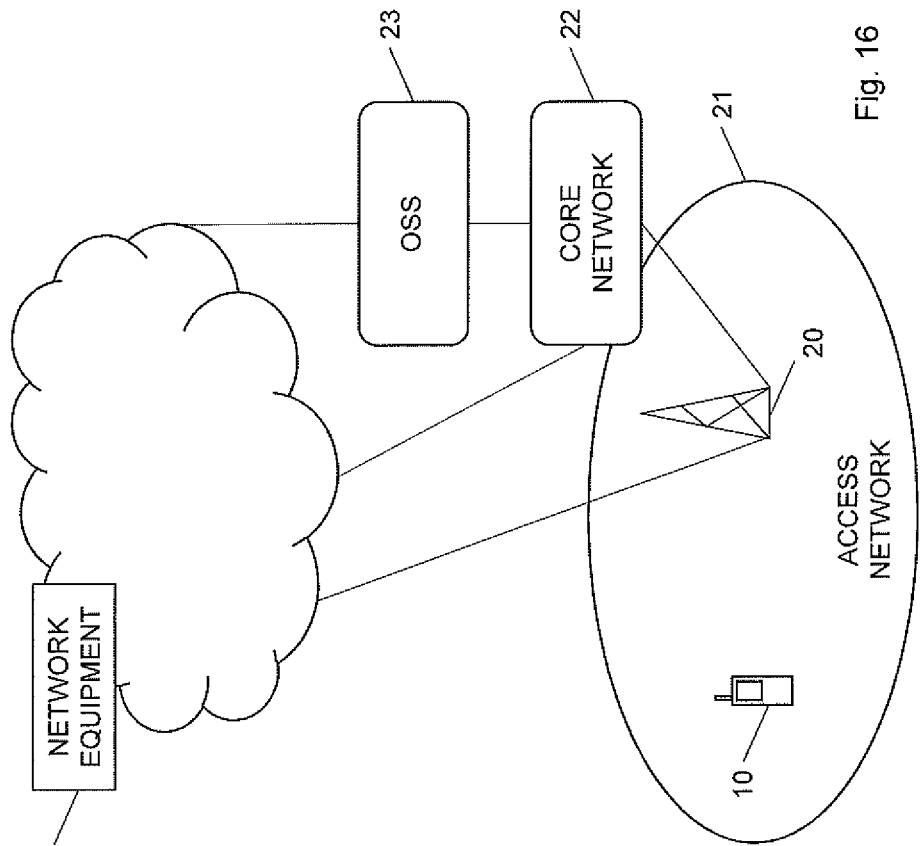
FIG. 16 is a schematic diagram of a wireless communication system according to an embodiment.

FIG. 16 is a schematic diagram illustrating an example of a wireless communication network or system, including an access network 21 and a core network 22 and optionally an operations and support system (OSS) 23 in cooperation with one or more cloud-based network equipment 300. The figure also illustrates a user equipment 10 connected to the access network 21 and capable of conducting wireless communication with a base station representing an embodiment of a network node 20.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Naccari and Pereira, Adaptive Bilateral Filter for Improved In-Loop Filtering in the Emerging High Efficiency Video Coding Standard, 2012 Picture Coding Symposium, May 7-9, 2012, Kraków, Poland, pages 397-400

[2] Suehring and Li. (2016) Jvet common test conditions and software reference configurations. [Online]. Available: http://phenix.intevry.frivet/doc end user/current document.php?id=2617

[3] Bjøntegaard, "Calculation of average psnr differences between rd curves," in document VCEG-M33, 13th VCEG Meeting, April 2001, Austin, Tex., USA, April 2001

The invention claimed is:

1. A method for filtering a picture of a video signal, wherein said picture comprises pixels, said method comprising:

modifying a pixel value of a pixel by a weighted combination of said pixel value and at least one spatially neighboring pixel value, wherein the weighted combination is obtained based on (i) a pixel distance between said pixel and a neighboring pixel, (ii) a pixel value difference between said pixel value and a neighboring pixel value of said neighboring pixel, (iii) a spatial parameter ($\sigma_d$), and (iv) a range parameter ($\sigma_r$), wherein said spatial parameter depends on (i) at least one of a width of a transform block and a height of said transform block and (ii) at least one of a prediction type of a block of pixels in said picture, a picture type of said picture, and a slice type of a slice in said picture, said block of pixels comprises said pixel, said slice comprises said pixel, and said range parameter $\sigma_r$ depends on one of a quantization parameter of said picture, a quantization parameter of said slice, and a quantization parameter of said block of pixels.

2. The method according to claim 1, wherein said spatial parameter $\sigma_d = p - A \times 0.025$, wherein A is selected from one of a minimum of said width of said transform block and said height of said transform block; a maximum of said width of said transform block and said height of said transform block; a mean of said width of said transform block and said height of said transform block; said width of said transform block; and said height of said transform block; and p is defined based on said at least one of said prediction type, said picture type and said slice type.

3. The method according to claim 2, wherein A is said minimum of said width of said transform block and said height of said transform block.

4. The method according to claim 2, wherein p is larger if said prediction type is intra prediction than if said prediction type is inter prediction.

5. The method according to claim 4, wherein p is 0.92 if said prediction type is intra prediction and 0.72 if said prediction type is inter prediction.

6. The method according to claim 2, wherein p is larger if said picture or slice type is intra picture or slice than if said picture or slice type is inter picture or slice.

7. The method according to claim 6, wherein p is 0.92 if said picture or slice type is intra picture or slice and 0.72 if said picture or slice type is inter picture or slice.

8. The method according to claim 6, wherein p is 0.92 if said picture or slice type is intra picture or slice, 0.82 if said picture or slice type is B inter picture or slice and 0.72 if said picture or slice type is P inter picture or slice.

9. The method according to claim 6, wherein p is 0.92 if said picture or slice type is intra picture or slice, 0.82 if said picture or slice type is inter picture or slice and not used for reference and 0.72 if said picture or slice type is inter picture or slice and used for reference.

10. The method according to claim 1, wherein said range parameter $$\sigma_r = \text{clip}\left(\frac{(QP-17) \times 2^{(bit\_depth-8)}}{8}, 0.01\right)$$

and bit_depth represents a bit depth of said video signal, and QP represents one of said quantization parameter of said picture, said quantization parameter of said slice, and said quantization parameter of said block of pixels.

11. The method according to claim 10, wherein said range parameter $\sigma_r = (QP-17)/2$.

12. The method according to claim 1, wherein modifying said pixel value comprises modifying said pixel value of said pixel by said weighted combination of said pixel value and said at least one spatially defined pixel value, which is based on respective weights that depend on said spatial parameter and said range parameter.

13. The method according to claim 12, wherein said respective weights $$\omega(i, j, k, l) = e^{\left(-\frac{(i-k)^2 + (j-l)^2}{2\sigma_d^2}\right)} e^{\left(-\frac{\|I(i,j)-I(k,l)\|^2}{2\sigma_r^2}\right)},$$

wherein I(k,l) represents a pixel value of pixel (k,l), I(i,j) represents a pixel value of pixel (i,j), $\sigma_d$ represents said spatial parameter, $\sigma_r$ represents said range parameter, and i, j, k, and l are positive integers.

14. The method according to claim 12, further comprising retrieving said respective weights from a look-up table (LUT) which comprises pre-computed weights, using i) said range parameter $\sigma_r$ or a quantization parameter and ii) a difference in pixel values ΔI as LUT index.

15. The method according to claim 1, wherein modifying said pixel value comprises modifying said pixel value by said weighted combination of said pixel value and said at least one spatially neighboring pixel value using a bilateral deringing filter outputting a modified pixel value $$I_D(i, j) = \frac{\sum_{k,l} I(k, l) \times \omega(i, j, k, l)}{\sum_{k,l} \omega(i, j, k, l)},$$

wherein I(k,l) represents a pixel value of pixel (k,l), I(i,j) represents a pixel value of pixel (i,j), $\sigma_d$ represents said spatial parameter, $\sigma_r$ represents said range parameter, and w(i, j, k, l) represents a respective weight.

16. The method according to claim 15, wherein modifying said pixel value comprises modifying said pixel value by said weighted combination of said pixel value and said at least one spatially neighboring pixel value using a bilateral deringing filter with a plus sign shaped filter aperture outputting said modified pixel value $$I_D(i, j) = \frac{\sum_{k,l} I(k, l) \times \omega(i, j, k, l)}{\sum_{k,l} \omega(i, j, k, l)},$$

wherein k=i−1,i,i+1 and l=j−1,j,j+1 with the proviso that when k=i−1, i+1 then l=j and when l=j−1,j+1 then k=i.

17. A device for filtering a picture of a video signal, wherein said picture comprises pixels, wherein said device is configured to modify a pixel value of a pixel by a weighted combination of said pixel value and at least one spatially neighboring pixel value, wherein the weighted combination is obtained based on (i) a pixel distance between said pixel and a neighboring pixel, (ii) a pixel value difference between said pixel value and a neighboring pixel value of said neighboring pixel, (iii) a spatial parameter ($\sigma_d$), and a range parameter ($\sigma_r$), wherein said spatial parameter depends on (i) at least one of a width of a transform block and a height of said transform block and (ii) at least one of a prediction type of a block of pixels in said picture, a picture type of said picture, and a slice type of a slice in said picture, said block of pixels comprises said pixel, said slice comprises said pixel, said spatial parameter $\sigma_d = p - A \times 0.025$, A is selected from one of a minimum of said width of said transform block and said height of said transform block; a maximum of said width of said transform block and said height of said transform block; a mean of said width of said transform block and said height of said transform block; said width of said transform block; and said height of said transform block, and p is defined based on said at least one of said prediction type, said picture type, and said slice type.

18. The device according to claim 17, wherein A is said minimum of said width of said transform block and said height of said transform block.

19. The device according to claim 17, wherein p is larger if said prediction type is intra prediction than if said prediction type is inter prediction.

20. The device according to claim 19, wherein p is 0.92 if said prediction type is intra prediction and 0.72 if said prediction type is inter prediction.

21. The device according to claim 17, wherein p is larger if said picture or slice type is intra picture or slice than if said picture or slice type is inter picture or slice.

22. The device according to claim 21, wherein p is 0.92 if said picture or slice type is intra picture or slice and 0.72 if said picture or slice type is inter picture or slice.

23. The device according to claim 21, wherein p is 0.92 if said picture or slice type is intra picture or slice, 0.82 if said picture or slice type is B inter picture or slice and 0.72 if said picture or slice type is P inter picture or slice.

24. The device according to claim 21, wherein p is 0.92 if said picture or slice type is intra picture or slice, 0.82 if said picture or slice type is inter picture or slice and not used for reference and 0.72 if said picture or slice type is inter picture or slice and used for reference.

25. The device according to claim 17, wherein said range parameter $\sigma_r$ depends on one of a quantization parameter of said picture, a quantization parameter of said slice, and a quantization parameter of said block of pixels.

26. The device according to claim 25, wherein said range parameter $$\sigma_r = \text{clip}\left(\frac{(QP - 17) \times 2^{(bit\_depth - 8)}}{8}, 0.01\right)$$

and bit_depth represents a bit depth of said video signal, and QP represents one of said quantization parameter of said picture, said quantization parameter of said slice, and said quantization parameter of said block of pixels.

27. The device according to claim 26, wherein said range parameter $\sigma_r = (QP - 17)/2$.

28. The device according to claim 17, wherein said device is configured to modify said pixel value of said pixel by said weighted combination of said pixel value and said at least one spatially defined pixel value which is based on respective weights that depend on said spatial parameter and said range parameter.

29. The device according to claim 28, wherein said respective weights $$\omega(i, j, k, l) = e^{\left(-\frac{(i-k)^2 + (j-l)^2}{2\sigma_d^2}\right)} e^{\left(-\frac{\|I(i,j) - I(k,j)\|^2}{2\sigma_r^2}\right)},$$

wherein I(k,l) represents a pixel value of pixel (k,l), I(i,j) represents a pixel value of pixel (i,j), $\sigma_d$ represents said spatial parameter, $\sigma_r$ represents said range parameter, and i, j, k, and l are positive integers.

30. The device according to claim 28, wherein said device is configured to retrieve said respective weights from a look-up table (LUT) which comprises pre-computed weights, using i) said range parameter $\sigma_r$ or a quantization parameter and ii) and a difference in pixel values $\Delta I$ as LUT index.

31. The device according to claim 17, wherein said device is configured to modify said pixel value by said weighted combination of said pixel value and said at least one spatially neighboring pixel value using a bilateral deringing filter outputting a modified pixel value $$I_D(i, j) = \frac{\sum_{k,l} I(k, l) \times \omega(i, j, k, l)}{\sum_{k,l} \omega(i, j, k, l)},$$

wherein I(k,l) represents a pixel value of pixel (k,l), I(i,j) represents a pixel value of pixel (i,j), $\sigma_d$ represents said spatial parameter, and $\sigma_r$ represents said range parameter, and w(i, j, k, l) represents a respective weight.

32. The device according to claim 31, wherein said device is configured to modify said pixel value by said weighted combination of said pixel value and said at least one spatially neighboring pixel value using a bilateral deringing filter with a plus sign shaped filter aperture outputting said modified pixel value $$I_D(i, j) = \frac{\sum_{k,l} I(k, l) \times \omega(i, j, k, l)}{\sum_{k,l} \omega(i, j, k, l)},$$

wherein k=i−1,i,i+1 and l=j−1,j,j+1 with the proviso that when k=i−1,i+1 then l=j and when l=j−1,j+1 then k=i.

33. The device according to claim 17, further comprising:

a processor; and a memory comprising instructions executable by said processor, wherein said processor is operative to modify said pixel value of said pixel by said weighted combination of said pixel value and said at least one spatially neighboring pixel value, wherein the weighted combination is obtained based on (i) said pixel distance between said pixel and said neighboring pixel, (ii) said pixel value difference between said pixel value and said neighboring pixel value of said neighboring pixel, (iii) said spatial parameter, and (iv) said range parameter.

34. A video encoder comprising a device according to claim 17.

35. A video decoder comprising a device according to claim 17.

36. A user equipment comprising one or more devices according to claim 17, wherein said user equipment is selected from a group consisting of a mobile telephone, a tablet, a desktop, a netbook, a multimedia player, a video streaming server, a set-top box and a computer, and wherein said one or more devices is a video encoder and/or a video decoder.

37. A computer program product comprising a non-transitory computer readable medium storing computer program instructions, which when executed by at least one processor, cause said at least one processor to modify a pixel value of a pixel by a weighted combination of said pixel value and at least one spatially neighboring pixel value, wherein the weighted combination is obtained based on (i) a pixel distance between said pixel and a neighboring pixel, (ii) a pixel value difference between said pixel value and a neighboring pixel value of said neighboring pixel, (iii) a spatial parameter, and (iv) a range parameter, wherein
- said spatial parameter depends on (i) at least one of a width of a transform block and a height of said transform block and (ii) at least one of a prediction type of a block of pixels in said picture, a picture type of said picture, and a slice type of a slice in said picture,
- said block of pixels comprises said pixel,
- said slice comprises said pixel, and
- said range parameter depends on one of a quantization parameter of said picture, a quantization parameter of said slice, and a quantization parameter of said block of pixels.

* * * * *